(12) United States Patent
Kuwahara et al.

(10) Patent No.: US 7,509,466 B2
(45) Date of Patent: Mar. 24, 2009

(54) BACKUP METHOD FOR A COPY PAIR USING NEWLY CREATED LOGICAL VOLUME VIA VIRTUAL SERVER DEVICE

(75) Inventors: Hiroshi Kuwahara, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 335 days.

(21) Appl. No.: 11/564,522

(22) Filed: Nov. 29, 2006

(65) Prior Publication Data

US 2008/0072002 A1 Mar. 20, 2008

(30) Foreign Application Priority Data

Sep. 20, 2006 (JP) ............... 2006-254075

(51) Int. Cl.
*G06F 12/00* (2006.01)
(52) U.S. Cl. ............... 711/162; 711/4; 711/112; 711/203; 707/204; 714/7
(58) Field of Classification Search ................. 711/162, 711/4, 112, 203; 707/204; 714/7
See application file for complete search history.

(56) References Cited

U.S. PATENT DOCUMENTS

| | | | | |
|---|---|---|---|---|
| 6,189,071 B1* | 2/2001 | Bachmat | ................. | 711/114 |
| 6,237,063 B1* | 5/2001 | Bachmat et al. | ............. | 711/114 |
| 6,742,138 B1* | 5/2004 | Gagne et al. | ................. | 714/6 |
| 6,868,506 B2* | 3/2005 | Gagne et al. | ................. | 714/6 |
| 6,968,347 B2* | 11/2005 | Gagne | ................. | 707/202 |
| 7,024,591 B2 | 4/2006 | Moody, II et al. | ............. | 714/43 |
| 7,069,410 B2* | 6/2006 | McBrearty et al. | ........... | 711/202 |
| 7,310,743 B1* | 12/2007 | Gagne et al. | ................. | 714/6 |
| 7,434,091 B1* | 10/2008 | Karr | ................. | 714/6 |
| 7,467,234 B2* | 12/2008 | Ikegaya et al. | ............. | 709/248 |
| 2001/0052058 A1* | 12/2001 | Ohran | ................. | 711/161 |
| 2002/0056031 A1* | 5/2002 | Skiba et al. | ................. | 711/162 |

FOREIGN PATENT DOCUMENTS

JP   2005-533314   7/2003
JP   2004-151824   5/2004

* cited by examiner

*Primary Examiner*—Stephen C Elmore
(74) *Attorney, Agent, or Firm*—Mattingly, Stanger, Malur & Brundidge, P.C.

(57) ABSTRACT

Provided is a technology in which: a request-source storage device provides a request-source server device with a storage area of a disk drive as at least one logical volume; the request-source server device determines, upon receiving a request to back up data stored in a first logical volume, whether a second logical volume which constitutes a copy pair with the first logical volume is present in the request-source storage device; the request-source server device requests, upon determining that the second logical volume is not present, the request-source storage device to produce the second logical volume; and the request-source server device transmits a request to execute a process to back up data stored in the existing or produced second logical volume to the backup storage device to the request-destination server device. Accordingly, data to be stored in a NAS not locally coupled to a backup device is appropriately backed up.

20 Claims, 25 Drawing Sheets

| 1331 | 1332 |
|---|---|
| VOLUME NAME | NAS ID |
| VOL-1 | NAS-1 |
| VOL-2 | NAS-1 |
| ABC | NAS-2 |
| XYZ | NAS-2 |

133

PATH DEFINITION MANAGEMENT TABLE

```
          1341         1342          1343
           /\           /\            /\
     ┌──────────────────────────────────────────────────────────┐
     │ YYYYMMDD     HH:MM:SS      EVENT                         │
     │ 20060801     00 : 00 : 00  VOLUME PRODUCTION (VOLUME NAME: AAA) │
     │ 20060802     13 : 00 : 00  VOLUME PRODUCTION (VOLUME NAME: ABC) │
     │ 20060802     13 : 00 : 30  VOLUME PRODUCTION (VOLUME NAME: XYZ) │
     │ 20060802     13 : 10 : 00  PAIR DEFINITION (MAIN: ABC, SUB: XYZ)│
     │                         :                                │
     └──────────────────────────────────────────────────────────┘
                                  ↖
                                  134
                               EVENT LOG
```

FIG. 4

| VOLUME NAME | MIRRORING SETTING | VOLUME TYPE | PAIRED VOLUME NAME | VOLUME PRODUCTION DATE AND TIME |
|---|---|---|---|---|
| AAA | NO | INDEPEDENT VOLUME | - | 20060801: 00:00:00 |
| ABC | YES | MAIN VOLUME | XYZ | 20060802: 13:00:00 |
| XYZ | YES | SUB VOLUME | ABC | 20060802: 13:00:30 |
| : | | : | : | : |

Column headers numbered: 1351, 1352, 1353, 1354, 1355

135

MIRRORING SETTING MANAGEMENT TABLE

BACKUP METHOD FOR A COPY PAIR USING NEWLY CREATED LOGICAL VOLUME VIA VIRTUAL SERVER DEVICE

CLAIM OF PRIORITY

The present application claims priority from Japanese patent application P2006-254075 filed on Sep. 20, 2006, the content of which is hereby incorporated by reference into this application.

BACKGROUND

This invention relates to a technology for backing up data stored in a network attached storage (NAS), and more particularly, to a technology for backing up data stored in a NAS which is not locally coupled to a backup device.

In order to back up data stored in a network attached storage (NAS), there are two types of backup: network backup and local backup.

In the network backup, a NAS stores backup data in a backup device coupled to the NAS via a LAN (Local Area Network). That is, in the network backup, since the NAS and the backup device are coupled with each other via the LAN, multiple NAS's can share a single backup device.

On the other hand, in the local backup, a NAS stores backup data in a backup device locally coupled to the NAS. That is, in the local backup, the NAS and the backup device are locally coupled with each other. Consequently, in the local backup, the backup can be carried out without influence of the traffic of a LAN.

A description will now be given of backup for a computer system where a NAS, which is not locally coupled to a backup device, and a NAS, which is locally coupled to the backup device, are coupled via a LAN.

The NAS, which is not locally coupled to the backup device, carries out backup by transmitting backup data via the LAN to the NAS, which is locally coupled to the backup device. In this case, a large amount of backup data is transported via the LAN. As a result, the backup data places a burden on communication between a client computer and the NAS.

JP 2004-151824 A discloses a technology to solve this problem. According to this technology, when the traffic on a LAN is low, a NAS, which is not locally coupled to a backup device, transmits backup data to a NAS, which is locally coupled to the backup device. That is, if the traffic on the LAN is high, the NAS, which is not locally coupled to the backup device, suspends the transmission of the backup data.

JP 2005-533314 A discloses a data backup technology for a case where a client computer and a tape device are coupled with each other via an FC (Fibre Channel).

SUMMARY

According to the technology disclosed in JP 2004-151824 A, if a large number of NAS's are coupled to the LAN, there poses such a problem that entire data stored in the large number of NAS's cannot be backed up until a time of the end of the service.

To solve this problem, a LAN dedicated for the backup may be constructed. However, if a LAN dedicated for the backup is constructed, of LAN ports provided for the NAS, the number of LAN ports used for the communication with client computers decreases. As a result, the quality of a file sharing service provided by the NAS for the client computers degrades.

To solve this problem, there may be provided a system where respective NAS's include a backup device. However, this system requires a large number of backup devices, resulting in a high cost.

It is therefore an object of this invention to provide a technology for properly backing up data stored in a NAS which is not locally coupled to a backup device.

According to an exemplary embodiment of this invention, there is provided a data backup method for a computer system that includes a request-source server device, a request-source storage device coupled to the request-source server device, a request-destination storage device coupled to the request-source storage device via a first communication line, a request-destination server device coupled to the request-destination storage device and coupled to the request-source server device via a second communication line, and a backup storage device coupled to the request-destination server device, the request-source storage device having a disk drive for storing data, and a disk control unit for controlling input and output of data to and from the disk drive, the data backup method comprising: providing, by the disk control unit, the request-source server device with a storage area of the disk drive as at least one logical volume; determining, by the request-source server device, upon receiving a request to back up data stored in a first logical volume which is one of the logical volumes, whether a second logical volume which constitutes a copy pair with the first logical volume is present in the request-source storage device; requesting, by the request-source server device, upon determining that the second logical volume is not present, the request-source storage device to produce the second logical volume; and transmitting, by the request-source server device, a request to execute a process to back up data stored in one of the existing second logical volume and the produced second logical volume to the backup storage device to the request-destination server device.

According to a typical embodiment of this invention, data stored in a NAS, which is not locally coupled to a backup device, is properly backed up.

BRIEF DESCRIPTION OF THE DRAWINGS

The present invention can be appreciated by the description which follows in conjunction with the following figures, wherein:

FIG. 4 shows a configuration of the event log stored in the disk subsystem according to the first embodiment of this invention;

FIG. 5 shows a configuration of the mirroring setting management table stored in the disk subsystem according to the first embodiment of this invention;

DETAILED DESCRIPTION OF THE PREFERRED EMBODIMENTS

A description will now be given of embodiments of this invention with reference to drawings.

First Embodiment

Figure 1:
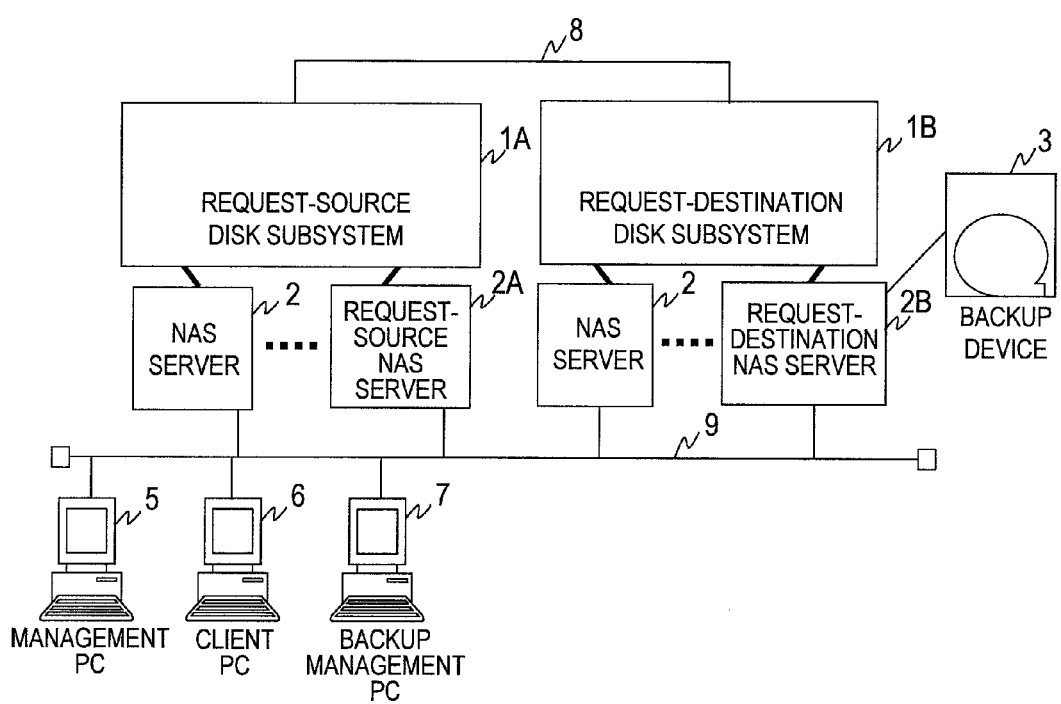
FIG. 1 is a block diagram of a configuration of a computer system according to a first embodiment of this invention.

FIG. 1 is a block diagram of a configuration of a computer system according to a first embodiment of this invention.

The computer system includes disk subsystems 1, NAS servers 2, a backup device 3, a management computer (management PC) 5, a client computer (client PC) 6, a backup management computer (backup management PC) 7, an FC (Fibre Channel) 8, and a LAN (Local Area Network) 9.

The disk subsystem 1 stores data to which the client computer 6 issues a write request. It should be noted that a detailed description will be given of the disk subsystem 1 with reference to FIG. 2.

The NAS server 2 provides the client computer 6 with a file sharing service. For example, the NAS server 2 receives a file input/output request from the client computer 6. Then, the NAS server 2 converts the received file input/output request into a block input/output request. Then, the NAS server 2 transmits the converted block input/output request to the disk subsystem 1. It should be noted that a detailed description will be given of the NAS server 2 with reference to FIG. 6.

According to this embodiment, a NAS server (request-source NAS server) 2A, which is not locally coupled to the backup device 3, requests for backup. A NAS server (request-destination NAS server) 2B, which is locally coupled to the backup device 3, receives the request for the backup.

That is, the request-source NAS server 2A requests the request-destination NAS server 2B to back up data stored in the disk subsystem (request-source disk subsystem) 1A coupled to the request-source NAS server 2A. Then, the request-destination NAS server 2B backs up the data stored in the request-source disk subsystem 1A to the backup device 3.

Further, the request-destination NAS server 2B backs up data stored in the disk subsystem (request-destination disk subsystem) 1B coupled to the request-destination NAS server 2B to the backup device 3.

The management computer 5, the client computer 6, and the backup management computer 7 respectively include a CPU, a memory, and an interface. It should be noted that a detailed description will be given of the management computer 5, the client computer 6, and the backup management computer 7 with reference to FIG. 9.

The NAS servers 2 provide the client computer 6 with the file sharing service. Thus, the client computer 6 transmits a file input/output request to the NAS servers 2.

The management computer 5 manages the entire computer system. For example, the management computer 5, upon an operation of an administrator or the like, instructs the backup management computer 7 to carry out backup and restore.

The backup management computer 7 manages the backup of data stored in the disk subsystems 1. For example, upon receiving an instruction of backup or restore, the backup management computer 7 transmits a backup request or a restore request to the NAS server 2. It should be noted that the backup management computer 7 may transmit the backup request to a NAS server 2 on predetermined timing set in advance.

The backup device 3 stores backup data of data stored in the request-destination disk subsystem 1B. Further, according to this embodiment, the backup device 3 stores backup data of data stored in the request-source disk subsystem 1A. That is, the backup device 3 is shared by the request-source disk subsystem 1A and the request-destination disk subsystem 1B. It should be noted that a detailed description will be given of the backup device 3 with reference to FIG. 8.

The FC 8 connects the request-source disk subsystem 1B and the request-destination disk subsystem 1A with each other. Further, the FC 8 connects the request-destination NAS server 2B and the backup device 3 with each other. Further, the FC 8 connects the disk subsystems 1 and the NAS servers 2 with each other. It should be noted that the disk subsystem 1 and the NAS server 2 may be coupled via a PCI bus in place of the FC 8.

The LAN 9 mutually connects the management computer 5, the client computer 6, the backup management computer 7, and the NAS servers 2.

Figures 2, 3:
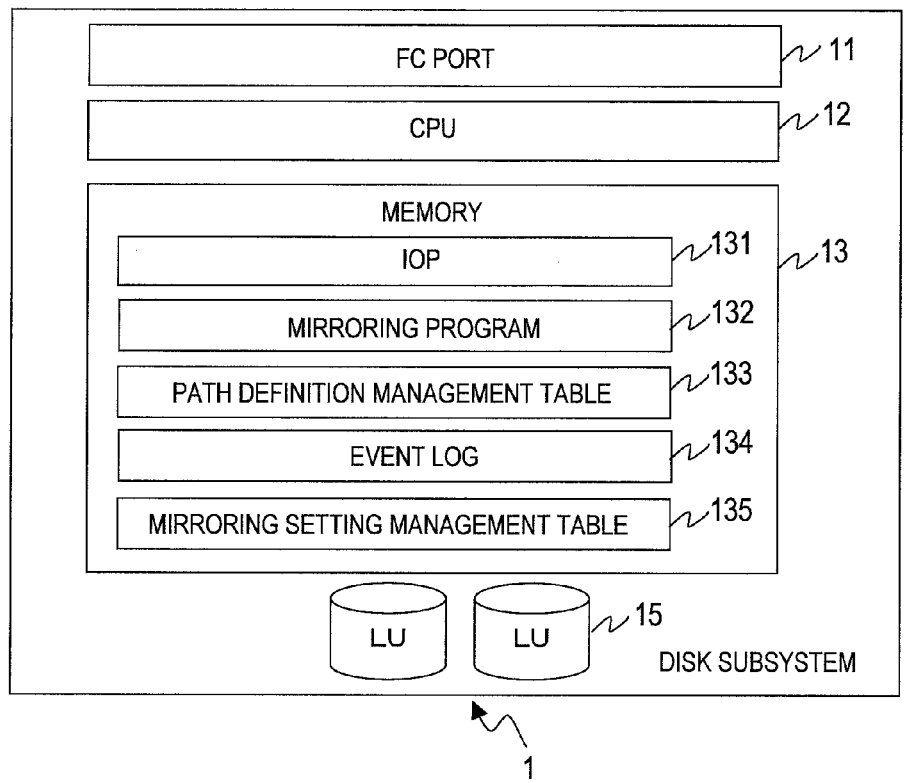
FIG. 2 is a block diagram of a configuration of the disk subsystem provided for the computer system according to the first embodiment of this invention.
FIG. 3 shows a configuration of the path definition management table stored in the disk subsystem according to the first embodiment of this invention.

FIG. 2 is a block diagram of a configuration of the disk subsystem 1 provided for the computer system according to the first embodiment of this invention.

The disk subsystem 1 includes a disk controller (DKC) and a physical disk.

The physical disk stores data to which the client computer 6 issues a write request. The disk controller provides the NAS server 2 with a storage area on the physical disk as one or more logical volumes (LU) 15.

The disk controller includes an FC port 11, a CPU 12, and a memory 13. The FC port 11 is an interface that connects to the NAS server 2 or the other disk sub system 1 via the FC 8. The CPU 12 executes a program stored in the memory 13 to carry out various types of process.

The memory 13 stores programs executed by the CPU 12, information required by the CPU 12, and the like. To be specific, the memory 13 stores an IOP 131, a mirroring program 132, a path definition management table 133, an event log 134, and a mirroring setting management table 135.

The IOP 131 inputs/outputs data to/from the physical disk in response to a block input/output request received from NAS servers 2. The mirroring program 132 produces a sub volume by mirroring an LU 15. The sub volume is an LU 15 which constitutes a copy pair along with an operating LU 15, which is a main volume.

Further, a part of the memory 13 is used as a cache memory. The cache memory temporarily stores data to be written to the physical disk, and data read out from the physical disk.

The path definition management table 133 indicates correspondences between an LU 15 provided by the disk subsystem 1 and a NAS server 2 for which the LU 15 is provided. It should be noted that a detailed description will be given of the path definition management table 133 with reference to FIG. 3.

The event log 134 shows a history of events which have occurred in the disk subsystem 1. It should be noted that a detailed description will be given of the event log 134 with reference to FIG. 4. The mirroring setting management table 135 is information on the mirroring of the LU's 15 provided by the disk subsystem 1. It should be noted that a detailed description will be given of the mirroring setting management table 135 with reference to FIG. 5.

FIG. 3 shows a configuration of the path definition management table 133 stored in the disk subsystem 1 according to the first embodiment of this invention.

The path definition management table 133 includes a volume name 1331 and a NAS ID 1332. The volume name 1331 is a name of an LU 15 provided by the disk subsystem 1. The NAS ID 1332 is a unique identifier of a NAS server 2 for which the LU 15 identified by the volume name 1331 of the record is provided.

FIG. 4 shows a configuration of the event log 134 stored in the disk subsystem 1 according to the first embodiment of this invention.

The event log 134 includes a date 1341, a time 1342, and an event description 1343.

The date 1341 and the time 1342 indicate when an event has occurred. The event description 1343 shows a process corresponding to the event. For example, the event description 1343 shows a volume production or a pair definition. The volume production shows that a new LU 15 is produced in the disk subsystem 1. The pair definition shows that a copy pair constituted by a main volume and a sub volume is defined.

FIG. 5 shows a configuration of the mirroring setting management table 135 stored in the disk subsystem 1 according to the first embodiment of this invention.

The mirroring setting management table 135 includes a volume name 1351, a mirroring setting 1352, a volume type 1353, a paired volume name 1354, and a volume production date and time 1355.

The volume name 1351 is a name of an LU 15 provided by the disk subsystem 1.

The volume type 1353 shows an attribute of the LU 15 identified by the volume name 1351 of this record. To be specific, the volume type 1353 indicates whether the LU 15 identified by the volume name 1351 of this record is an independent volume, a main volume, or a sub volume. It should be noted that an independent volume is an LU 15 which is not paired with an LU 15 to constitute a copy pair.

The paired volume name 1354 is a name of an LU 15 which is paired with the LU 15 identified by the volume name 1351 of this record to constitute a copy pair. For example, if the LU 15 identified by the volume name 1351 of this record is a main volume, the paired volume name 1354 is a name of a sub volume paired with this main volume to constitute a copy pair. On the other hand, if the LU 15 identified by the volume name 1351 of this record is a sub volume, the paired volume name 1354 is a name of a main volume paired with this sub volume to constitute a copy pair. If an LU 15 which is paired with the LU 15 identified by the volume name 1351 of this record to constitute a copy pair is not set, no value is stored to the paired volume name 1354.

The mirroring setting 1352 shows whether the LU 15 identified by the volume name 1351 of this record and the LU 15 identified by the paired volume name 1354 of this record store the same data or not. That is, the mirroring setting 1352 shows whether the LU 15 identified by the volume name 1351 of this record and the LU 15 identified by the paired volume name 1354 of this record are in a copy pair state or not.

The volume production date and time 1355 shows a date and a time when the LU 15 identified by the volume name 1351 of this record is produced.

Figure 6:
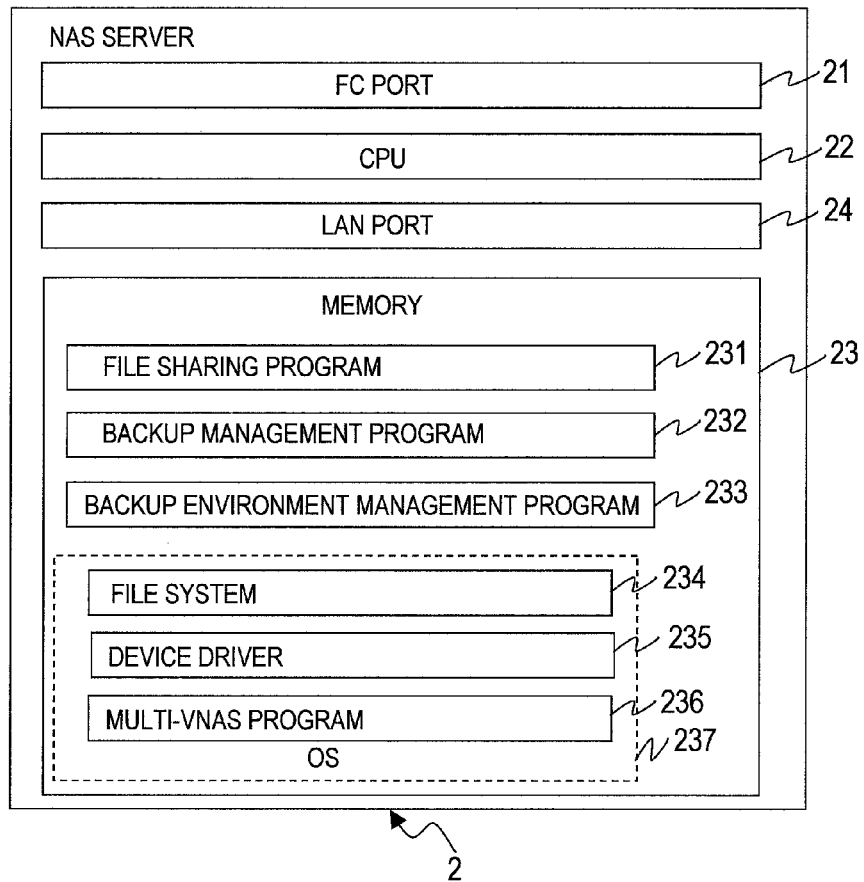
FIG. 6 is a block diagram of a configuration of the NAS server provided for the computer system according to the first embodiment of this invention.

FIG. 6 is a block diagram of a configuration of the NAS server 2 provided for the computer system according to the first embodiment of this invention.

The NAS server 2 includes an FC port 21, a CPU 22, a memory 23, and a LAN port 24.

The FC port 21 is an interface that connects to the disk subsystems 1 or the backup device 3 via the FC 8. The LAN port 24 is an interface that connects to the management computer 5, the client computer 6, or the backup management computer 7 via the LAN 9.

The CPU 22 executes a program stored in the memory 23 to carry out various types of process.

The memory 23 stores programs executed by the CPU 22, information required by the CPU 22, and the like. To be specific, the memory 23 stores a file sharing program 231, a backup management program 232, a backup environment management program 233, and an OS 237.

The file sharing program 231 provides the client computer 6 with the file sharing service. It should be noted that a file sharing protocol such as network file system (NFS) and common internet file system (CIFS) is used between the NAS server 2 and the client computer 6.

The backup management program 232 backs up data stored in the disk subsystem 1 to the backup device 3. Further, the backup management program 232 restores data stored in the disk subsystem 1 using backup data stored in the backup device 3. It should be noted that a protocol such as network data management protocol (NDMP) is used between NAS servers 2, and between a NAS server 2 and the backup management computer 7.

The backup environment management programs 233 constructs an environment required to back up data stored in the disk subsystem 1. The backup environment management program 233 constructs an environment required to restore data stored in the disk subsystem 1.

The OS 237 controls entire processes of the NAS server 2. Further, the OS 237 includes a file system 234, device drivers 235, and a multi-VNAS program 236.

The file system 234 provides the client computer 6 and the like with data stored in the disk system 1 as a file. For example, the file system 234 receives a file input/output request. Then, the file system 234 converts the received file input/output request into a block input/output request.

The device driver 235 transmits the block input/output request converted by the file system 234 to a disk subsystem 1. In this way, the device driver 235 inputs/outputs data to/from the disk subsystem 1.

The multi-VNAS program 236 constructs a virtual NAS (VNAS) on this NAS server 2 by means of a logical partitioning function provided for a kernel, which is not shown. As a result, the multi-VNAS program 236 provides the client computer 6 and the like with multiple independent VNAS's. It should be noted that a detailed description will be given of the VNAS with reference to FIG. 7.

Figure 7:
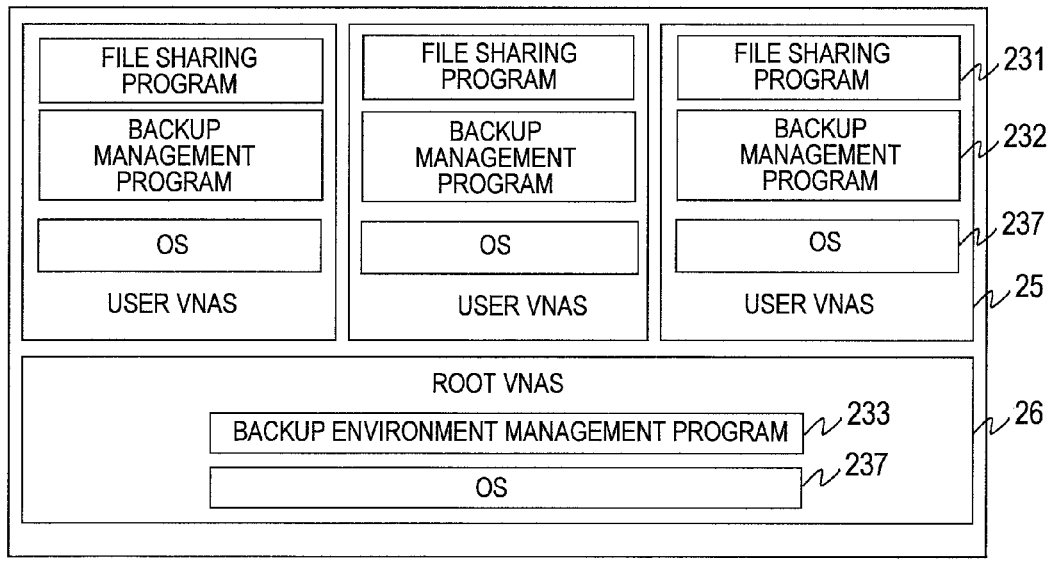
FIG. 7 describes the VNAS according to the first embodiment of this invention.

FIG. 7 describes the VNAS according to the first embodiment of this invention.

The VNAS is constructed by the multi-VNAS program 236 on a NAS server 2. According to this embodiment, the VNAS includes one root VNAS 26 and multiple user VNAS's 25.

The root VNAS 26 manages resources of the NAS server 2. To be specific, the root VNAS 26 allocates the resources of the NAS server 2 to the user VNAS's 25. As a result, the root VNAS 26 constructs an environment for the user VNAS's 25.

Further, the root VNAS 26 includes a backup environment management program 233 and an OS 237. It should be noted that the backup environment management program 233 and the OS 237 provided for the root VNAS 26 are the same as those provided for the NAS server 2 shown in FIG. 6, and a description thereof, therefore, is omitted.

The respective user VNAS's 25 use the allocated resources of the NAS server 2 to provide the client computer 6 with the file sharing service. Further, the respective user VNAS's 25 includes a file sharing program 231, a backup management program 232, and an OS 237. It should be noted that the file sharing program 231, the backup management program 232, and the OS 237 provided for the user VNAS 25 are the same as those provided for the NAS server 2 shown in FIG. 6, and a description thereof, therefore, is omitted.

Figure 8:
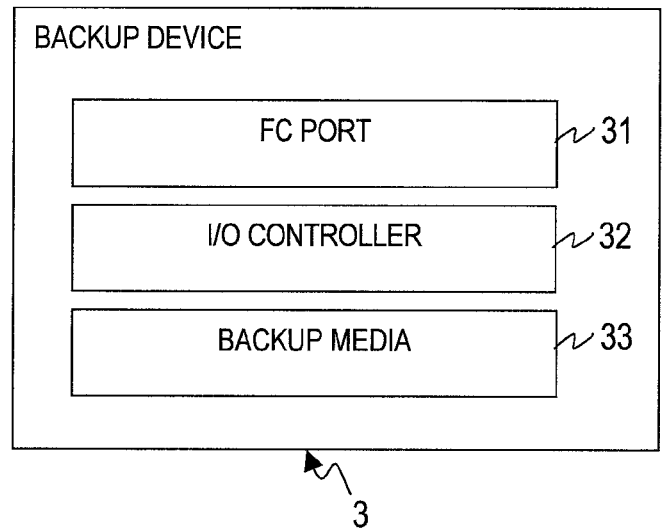
FIG. 8 is a block diagram of a configuration of the backup device provided for the computer system according to the first embodiment of this invention.

FIG. 8 is a block diagram of a configuration of the backup device 3 provided for the computer system according to the first embodiment of this invention.

The backup device 3 includes an FC port 31, an I/O controller 32, and backup media 33.

The FC port 31 is an interface that connects to NAS servers 2 via the FC 8. The I/O controller 32 controls input/output of backup data to/from the backup media 33.

The backup media 33 may be any media as long as they can store data. For example, the backup media 33 may be magnetic tapes, disks, or flash memories.

Figure 9:
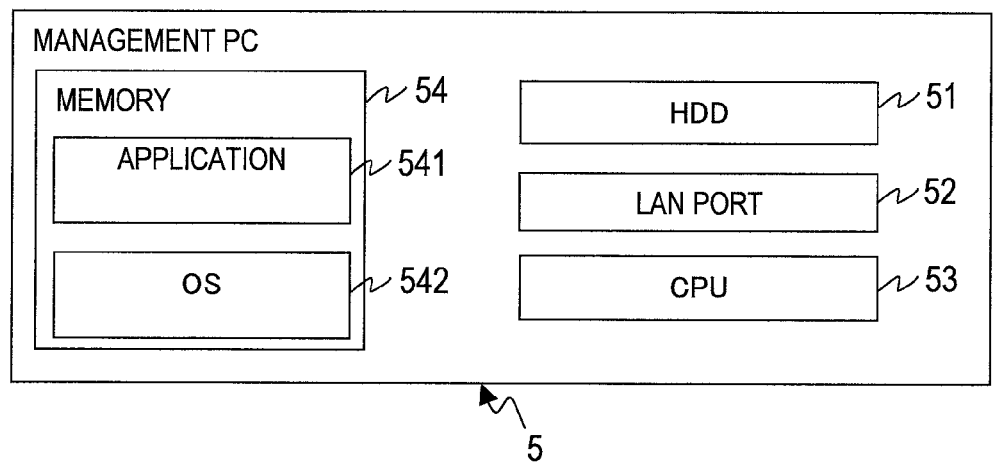
FIG. 9 is a block diagram of a configuration of the management computer provided for the computer system according to the first embodiment of this invention.

FIG. 9 is a block diagram of a configuration of the management computer 5 provided for the computer system according to the first embodiment of this invention.

The management computer 5 includes a hard disk 51, a LAN port 52, a CPU 53, and a memory 54.

The LAN port 52 is an interface that connects to the NAS servers 2, the client computer 6, and the backup management computer 7 via the LAN 9. The hard disk 51 stores various types of information.

The CPU 53 executes a program stored in the memory 54 to carry out various types of process. The memory 54 stores programs executed by the CPU 53, information required by the CPU 53, and the like. To be specific, the memory 54 stores an application 541 and an OS 542.

The application 541 carries out various types of process. The application 541 is a WEB browser, for example. The OS 542 controls the entire processes of the management computer 5.

It should be noted that the configurations of the client computer 6 and the backup management computer 7 are the same as that of the management computer 5, and a description thereof, therefore, is omitted.

Figure 10:
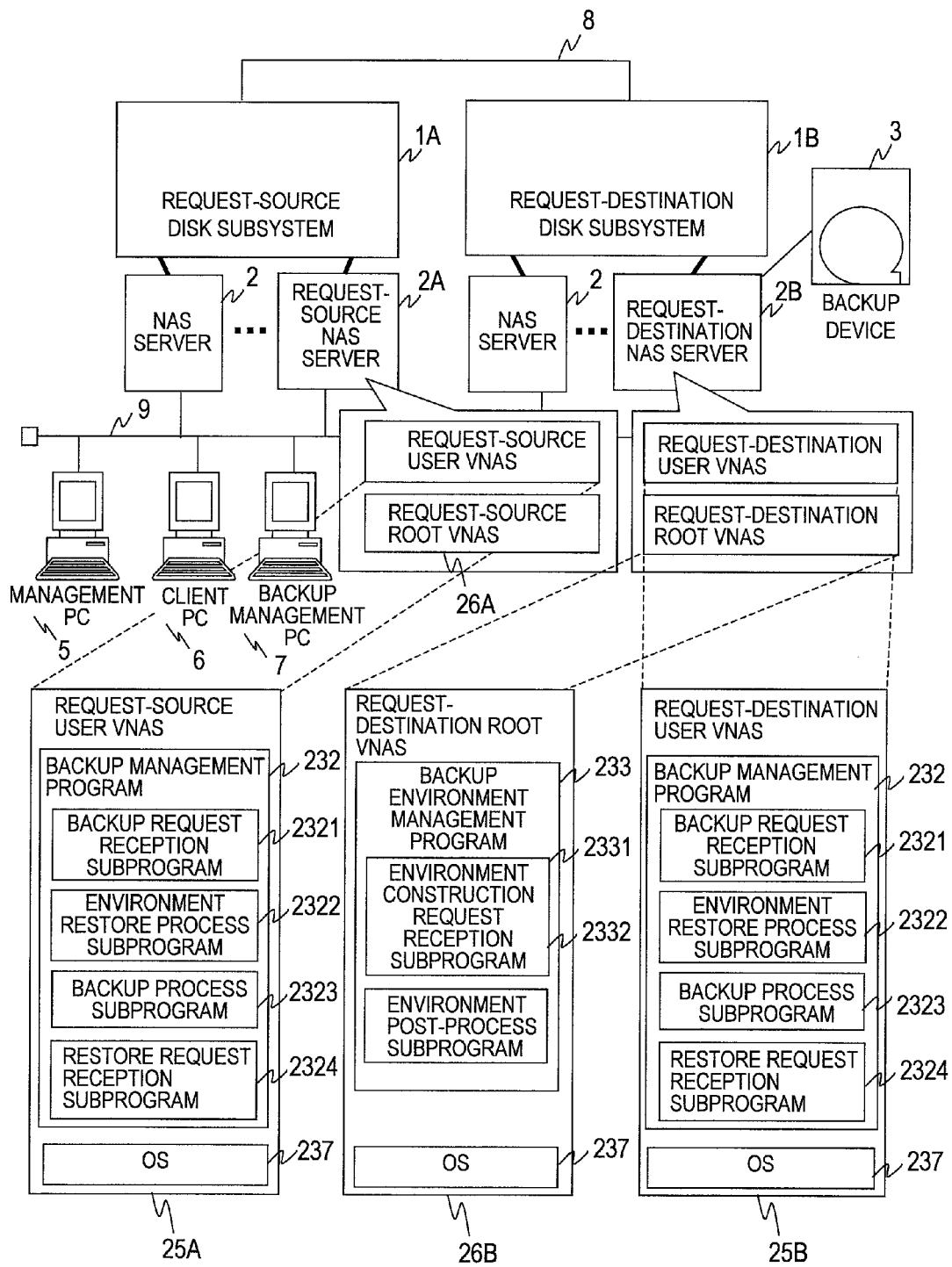
FIG. 10 describes the user VNAS's and the root VNAS's in the computer system according to the first embodiment of this invention.

FIG. 10 describes the user VNAS's and the root VNAS's in the computer system according to the first embodiment of this invention.

The request-source NAS server 2A includes a request-source user VNAS 25A and a request-source root VNAS 26A. Further, the request-destination NAS server 2B includes a request-destination root VNAS 26B. Further, in the course of the backup process, a request-destination user VNAS 25B is produced in the request-destination NAS server 2B.

The request-source user VNAS 25A and the request-destination user VNAS 25B include the backup management program 232 and the OS 237. The backup management program 232 includes a backup request reception subprogram 2321, an environment restore process subprogram 2322, a backup process subprogram 2323, and a restore request reception subprogram 2324.

The backup request reception subprogram 2321, upon receiving a backup request from the backup management computer 7, constructs an environment to carry out backup on the request-source disk subsystem 1A. Then, the backup request reception subprogram 2321 transmits an environment construction request to the request-destination root VNAS 26B provided for the request-destination NAS server 2B. It should be noted that the backup request reception subprogram 2321 is executed on the request-source user VNAS 25A.

The environment restore process subprogram 2322 restores an environment constructed on the request-source disk subsystem 1A to carry out backup to an original state. It should be noted that the environment restore subprogram 2322 is executed on the request-source user VNAS 25A.

Then, the backup process subprogram 2323 backs up data stored in the request-source disk subsystem 1A to the backup device 3. It should be noted that the backup process subprogram 2323 is executed on the request-destination user VNAS 25B.

The restore request reception subprogram 2324, upon receiving a restore request from the backup management computer 7, constructs an environment to carry out restore on the request-source disk subsystem 1A. Then, the restore request reception subprogram 2324 transmits an environment construction request to the request-destination root VNAS 26B provided for the request-destination NAS server 2B. It should be noted that the restore request reception subprogram 2324 is executed on the request-source user VNAS 25A.

The request-destination root VNAS 26B includes the backup environment management program 233 and the OS 237. The backup environment management program 233 includes an environment construction request reception subprogram 2331 and an environment post-process subprogram 2332.

The environment construction request reception subprogram 2331, upon receiving an environment construction request from the backup request reception subprogram 2321, constructs an environment to carry out backup. For example, the environment construction request reception subprogram 2331 produces a request-destination user VNAS 25B.

When data stored in the request-source disk subsystem 1A has been backed up, the environment post-process subprogram 2332 restores an environment constructed to carry out backup to an original state. For example, the environment post-process subprogram 2332 deletes a request-destination user VNAS 25B.

Figure 11:
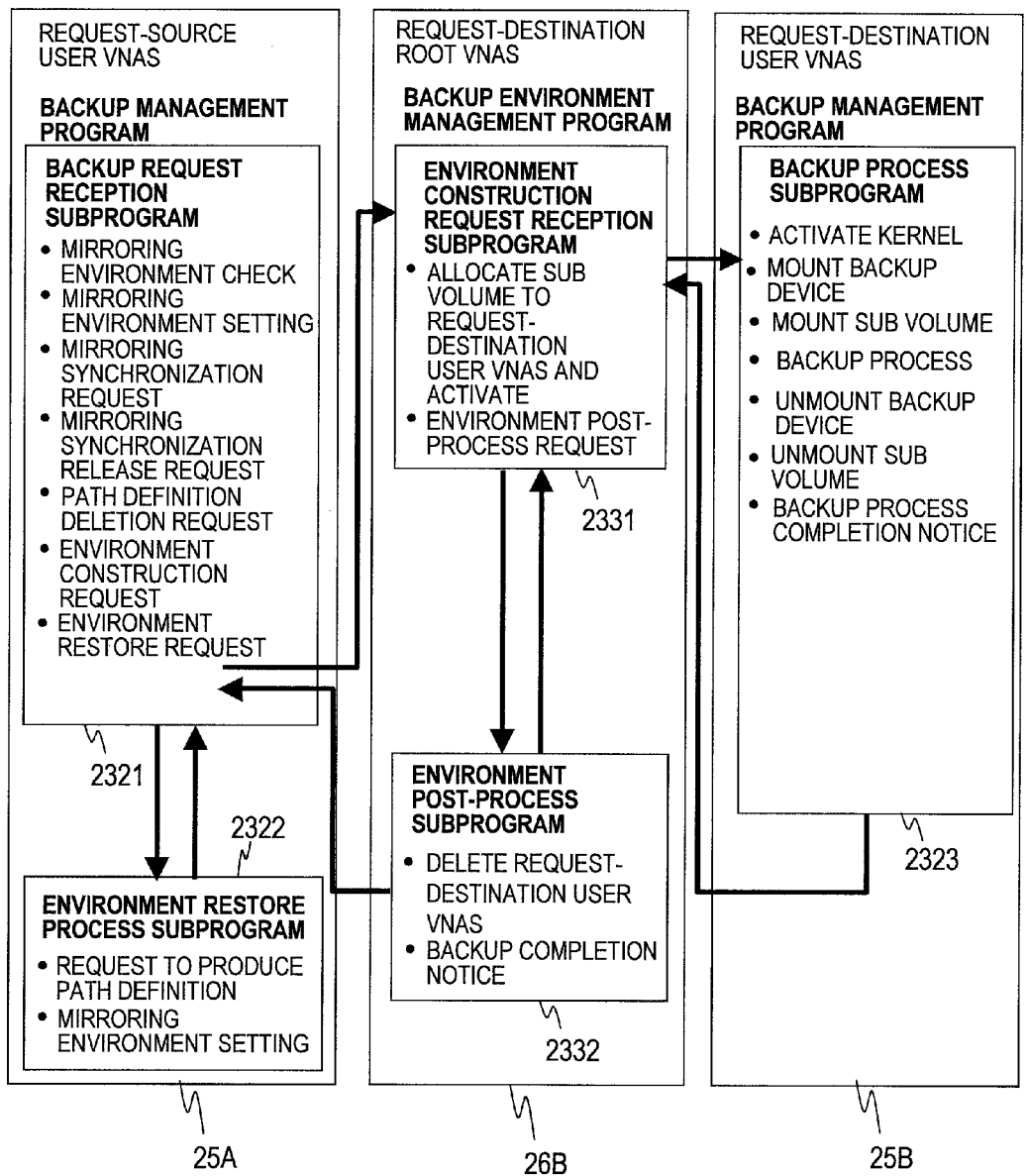
FIG. 11 describes an overview of the backup request execution process executed by the computer system according to the first embodiment of this invention.

FIG. 11 describes an overview of the backup request execution process executed by the computer system according to the first embodiment of this invention.

First, the backup request reception subprogram 2321 of the request-source user VNAS 25A receives a backup request from the backup management computer 7. Then, the backup request reception subprogram 2321 carries out a mirroring environment check, a mirroring environment setting, a mirroring synchronization request, a mirroring synchronization release request, a path definition deletion request, and the like. Then, the backup request reception subprogram 2321 transmits an environment construction request to the environment construction request reception subprogram 2331 of the request-destination root VNAS 26B. It should be noted that a detailed description will be given of the process by the backup request reception subprogram 2321 with reference to FIGS. 12 and 13.

The environment construction request reception subprogram 2331 of the request-destination root VNAS 26B, upon receiving the environment construction request, produces a request-destination user VNAS 25B. Then, the environment construction request reception subprogram 2331 allocates a sub volume to which data to be backed up is stored to the produced request-destination user VNAS 25B. Then, the environment construction request reception subprogram 2331 activates the produced request-destination user VNAS 25B. Then, the environment construction request reception subprogram 2331 requests the backup process subprogram 2323 of the activated request-destination user VNAS 25B to execute the backup process. It should be noted that a detailed description will be given of the process by the environment construction request reception subprogram 2331 with reference to FIGS. 14 and 15.

The backup process subprogram 2323 of the request-destination user VNAS 25B, upon receiving the request to execute the backup process, carries out a kernel activation, a mount of the backup device 3, a mount of the allocated sub volume, the backup process, an unmount of the backup device 3, and an unmount of the allocated sub volume. Then, the backup process subprogram 2323 notifies the environment construction request reception subprogram 2331 of the request-destination root VNAS 26B of the completion of the backup process. It should be noted that a detailed description will be given of the process by the backup process subprogram 2323 with reference to FIGS. 16 and 17.

The environment construction request reception subprogram 2331 of the request-destination root VNAS 26B, upon being notified of the completion of the backup process, requests the environment post-process subprogram 2332 of the request-destination root VNAS 26B to execute the environment post-process.

The environment post-process subprogram 2332 of the request-destination root VNAS 26B, upon being requested to execute the environment post-process, deletes the request-destination user VNAS 25B. Then, the environment post-process subprogram 2332 transmits a backup completion notice to the backup request reception subprogram 2321 of the request-source user VNAS 25A. It should be noted that a detailed description will be given of the process by the environment post-process subprogram 2332 with reference to FIGS. 18 and 19.

The backup request reception subprogram 2321 of the request-source user VNAS 25A, upon receiving the backup completion notice, requests the environment restore process subprogram 2322 of the request-source user VNAS 25A to execute the environment restore process.

The environment restore process subprogram 2322 of the request-source user VNAS 25A, upon being requested to execute the environment restore process, executes a request to construct a definition of a path and a mirroring environment setting. It should be noted that a detailed description will be given of the process by the environment restore process subprogram 2322 with reference to FIGS. 20 and 21.

As described above, when the request-source NAS server 2A receives a backup request, the request-source NAS server 2A and the request-destination NAS server 2B cooperate to construct the environments required to execute the backup. Then, the request-destination NAS server 2B backs up data stored in the request-source disk subsystem 1A, which is not locally coupled to the backup device 3, to the backup device 3.

Figure 12:
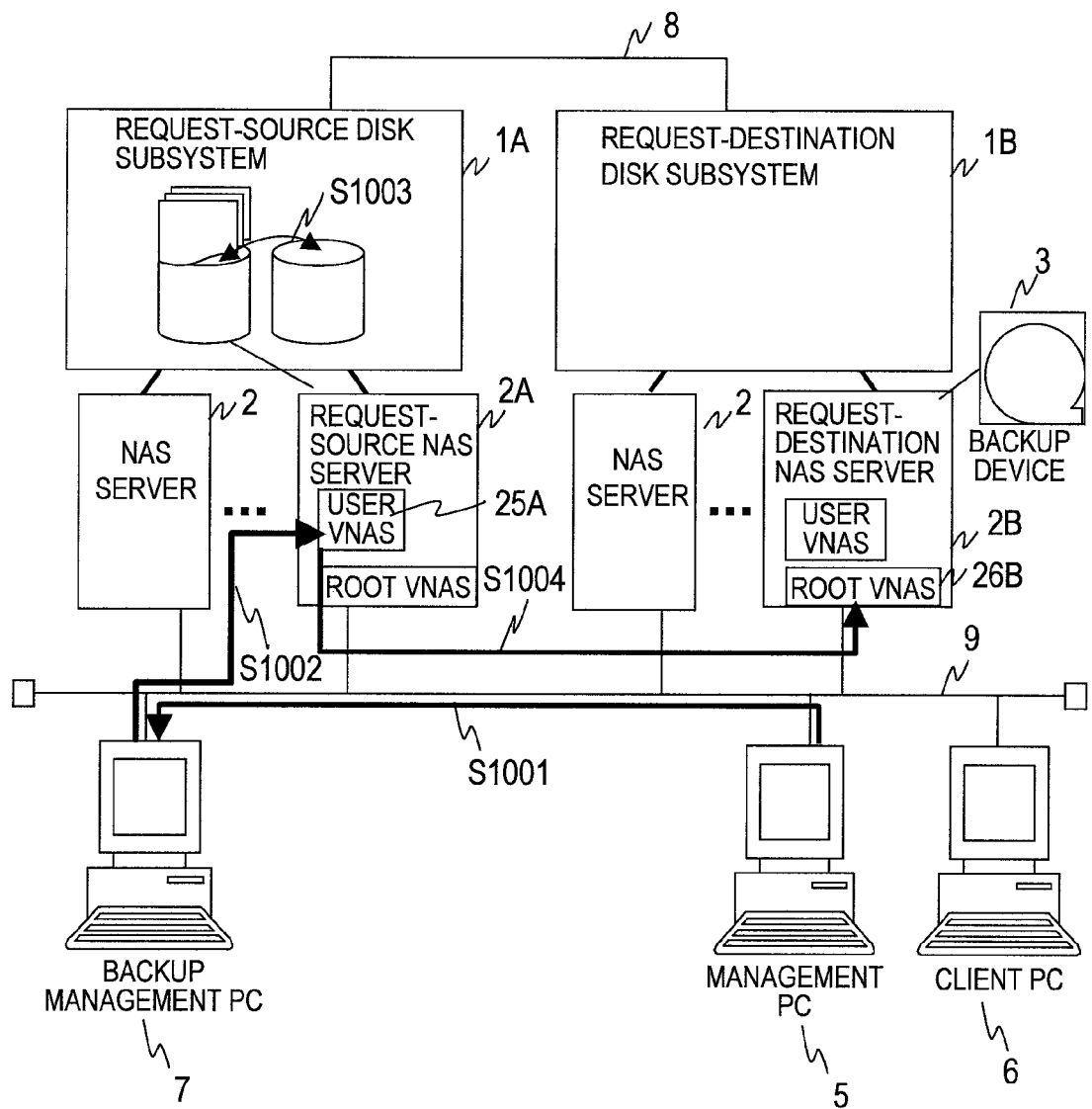
FIG. 12 describes the process by the backup request reception subprogram executed by the request-source user VNAS according to the first embodiment of this invention.

FIG. 12 describes the process by the backup request reception subprogram 2321 executed by the request-source user VNAS 25A according to the first embodiment of this invention.

First, the management computer 5, upon an operation of an administrator or the like, instructs the backup management computer 7 to back up data stored in the request-source disk subsystem 1A (S1001).

The backup management computer 7, upon receiving the instruction of the backup, transmits a request for the backup to the request-source user VNAS 25A provided for the request-source NAS server 2A (S1002). It should be noted that the backup management computer 7 may transmit the backup request to the request-source user VNAS 25A provided for the request-source NAS server 2A in predetermined timing.

The request-source user VNAS 25A provided for the request-source NAS server 2A receives the backup request from the backup management computer 7. Then, the request-source user VNAS 25A determines whether there exists an LU 15 (sub volume) which constitutes a copy pair with an LU 15 (main volume) for which the backup is requested. If there is not a sub volume, the request-source user VNAS 25A requests the request-source disk subsystem 1A to produce a sub volume to constitute a copy pair with the main volume for which the backup is requested. Then, the request-source disk subsystem 1A produces a sub volume.

Then, the request-source user VNAS 25A requests the request-source disk subsystem 1A to synchronize the main volume and the sub volume with each other. Then, the request-source disk subsystem 1A synchronizes the main volume and the sub volume with each other by means of mirroring (S1003). As a result, data in the main volume and data in the sub volume become the same. That is, the sub volume is now containing data to be backed up.

Then, the request-source user VNAS 25A requests the request-source disk subsystem 1A to release the synchronization between the main volume and the sub volume. Then, the request-source disk subsystem 1A releases the synchronization between the main volume and the sub volume by splitting the main volume and the sub volume from each other.

Then, the request-source user VNAS 25A transmits an environment construction request to the request-destination root VNAS 26B provided for the request-destination NAS server 2B (S1004).

Then, the request-source user VNAS 25A waits until the reception of a backup completion notice. The request-source user VNAS 25A, upon receiving a backup completion notice, executes the environment restore process subprogram 2322. Then, the request-source user VNAS 25A finishes the backup request reception subprogram 2321.

Figure 13:
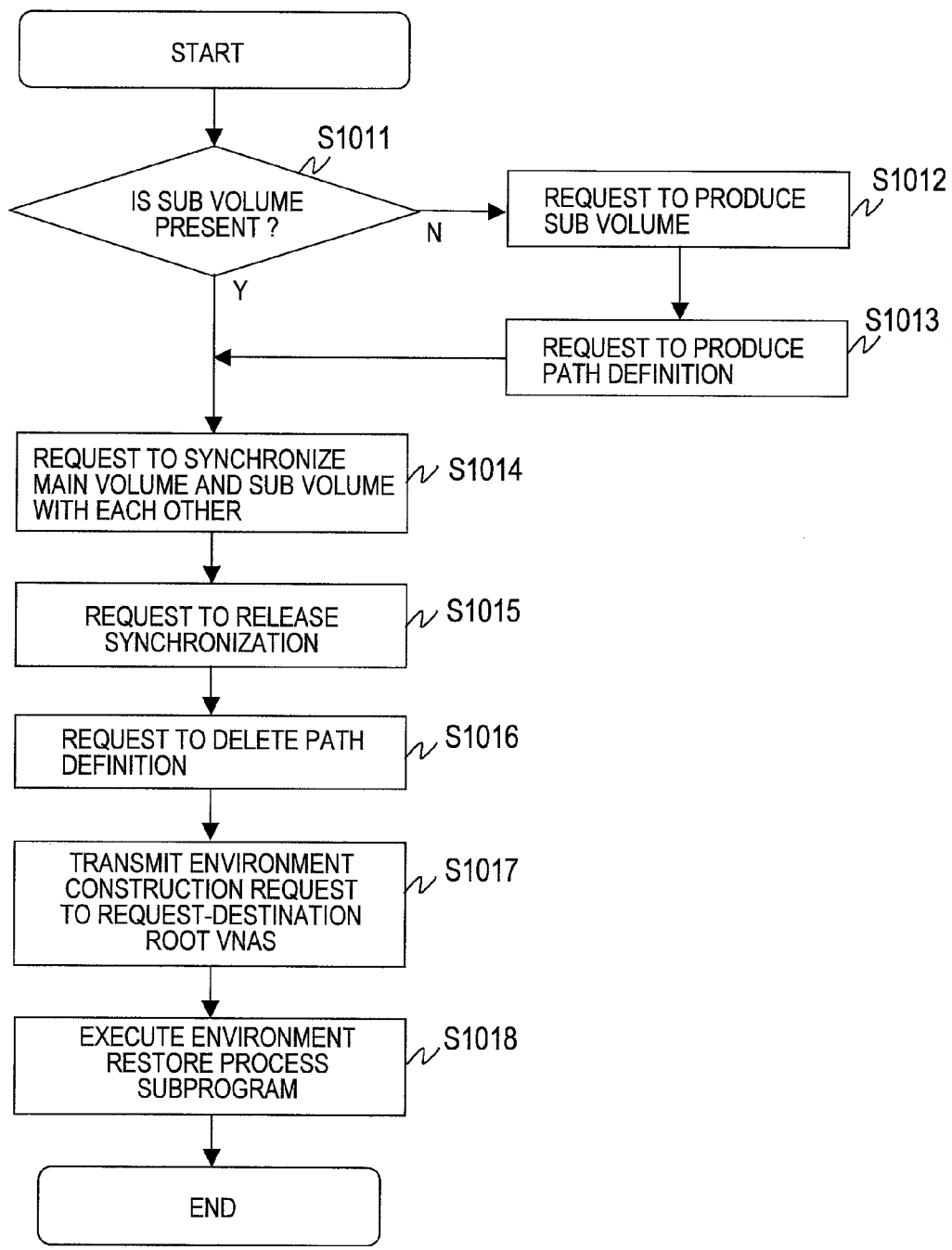
FIG. 13 is a flowchart of the process by the backup request reception subprogram executed by the request-source user VNAS according to the first embodiment of this invention.

FIG. 13 is a flowchart of the process by the backup request reception subprogram 2321 executed by the request-source user VNAS 25A according to the first embodiment of this invention.

The request-source user VNAS 25A, upon receiving a backup request from the backup management computer 7, executes the backup request reception subprogram 2321. It should be noted that the backup request includes the name of an LU 15 for which the backup of data is requested.

First, the request-source user VNAS 25A refers to the mirroring setting management table 135 stored in the request-source disk subsystem 1A to determine whether an LU 15 (sub volume) which constitutes a copy pair with the LU 15 (main volume) identified by the name included in the received backup request exists (S1011).

To be specific, the request-source user VNAS 25A selects a record whose volume name 1351 coincides with the name included in the received backup request from the mirroring setting management table 135. Then, the request-source user VNAS 25A extracts the volume type 1353 from the selected record.

If the extracted volume type 1353 is containing "Main Volume", the request-source user VNAS 25A determines that a sub volume exists. In this case, the request-source user VNAS 25A simply proceeds to a step S1015.

If the extracted volume type 1353 contains "Independent Volume", the request-source user VNAS 25A determines that a sub volume does not exist. In this case, the request-source user VNAS 25A requests the request-source disk subsystem 1A to produce a sub volume which constitutes a copy pair with the main volume identified by the name included in the received backup request (S1012). Then, the request-source disk subsystem 1A produces a sub volume. On this occasion, the request-source disk subsystem 1A updates the mirroring setting management table 135.

To be specific, the request-source disk subsystem 1A produces a new record in the mirroring setting management table 135. Then, the request-source disk subsystem 1A stores a name of the produced sub volume in the volume name 1351 of the new record. Then, the request-source disk subsystem 1A stores "Yes" in the mirroring setting 1352 of the new record.

Then, the request-source disk subsystem 1A stores "Sub Volume" in the volume type 1353 of the new record. Then, the request-source disk subsystem 1A stores the name included in the backup request in the paired volume name 1354 of the new record. Then, the request-source disk subsystem 1A stores the present date and time in the volume production data and time 1355 of the new record.

Then, the request-source disk subsystem 1A selects the record whose volume name 1351 coincides with the name included in the backup request from the mirroring setting management table 135. Then, the request-source disk subsystem 1A stores "Yes" in the mirroring setting 1352 of the selected record. Then, the request-source disk subsystem 1A stores "Main Volume" in the volume type 1353 of the selected record. Then, the request-source disk subsystem 1A stores the name of the produced sub volume in the paired volume name 1354 of the selected record.

Then, the request-source disk subsystem 1A stores the production of the volume as an event in the event log 134. Further, the request-source disk subsystem 1A stores the pair definition as an event in the event log 134.

Then, the request-source user VNAS 25A requests the request-source disk subsystem 1A to produce a path definition (S1013). Then, the request-source disk subsystem 1A stores a definition of a path, which is an access route to the produced sub volume, in the path definition management table 133.

To be specific, the request-source disk subsystem 1A produces a new record in the path definition management table 133. Then, the request-source disk subsystem 1A stores a name of the produced sub volume in the volume name 1331 of the new record. Then, the request-source disk subsystem 1A stores an identifier of the request-source user VNAS 25A in the NSID 1332 of the new record.

Then, the request-source user VNAS 25A requests the request-source disk subsystem 1A to synchronize the main volume and the sub volume with each other (S1014). Then, the request-source disk subsystem 1A synchronizes the main volume and the sub volume with each other by means of mirroring. As a result, data in the main volume and data in the sub volume become the same.

Then, the request-source user VNAS 25A requests the request-source disk subsystem 1A to release the synchronization between the main volume and the sub volume (S1015). Then, the request-source disk subsystem 1A releases the synchronization between the main volume and the sub volume by splitting the main volume and the sub volume. On this occasion, the request-source disk subsystem 1A updates the mirroring setting management table 135.

To be specific, the request-source disk subsystem 1A selects the record whose volume name 1351 coincides with the name of the main volume from the mirroring setting management table 135. Then, the request-source disk subsystem 1A stores "No" in the mirroring setting 1352 of the selected record. Then, the request-source disk subsystem 1A selects the record whose volume name 1351 coincides with the sub volume name from the mirroring setting management table 135. Then, the request-source disk subsystem 1A stores "No" in the mirroring setting 1352 of the selected record.

Further, the request-source disk subsystem 1A stores the synchronization release as an event in the event log 134.

Then, the request-source user VNAS 25A requests the request-source disk subsystem 1A to delete the path definition which is the access route to the sub volume (S1016).

Then, the request-source disk subsystem 1A deletes the definition of the path, which is the access route to the sub volume, from the path definition management table 133.

To be specific, the request-source disk subsystem 1A deletes the record whose volume name 1331 coincides with the sub volume name from the mirroring setting management table 133.

Then, the request-source user VNAS 25A transmits an environment construction request to the request-destination root VNAS 26B provided for the request-destination NAS server 2B (S1017). For this purpose, the request-source user VNAS 25A stores network information on the request-destination root VNAS 26B provided for the request-destination NAS server 2B locally coupled to the backup device 3.

The request-destination root VNAS 26B, upon receiving the environment construction request, executes the environment construction request reception subprogram 2331. It should be noted that a detailed description will be given of the process by the environment construction request reception subprogram 2331 with reference to FIGS. 14 and 15.

On the other hand, the request-source user VNAS 25A waits until the reception of a backup completion notice from the request-destination root VNAS 26B. The request-source user VNAS 25A, upon receiving a backup completion notice, executes the environment restore process subprogram 2322 (S1018). It should be noted that a detailed description will be given of the process by the environment restore process subprogram 2322 with reference to FIGS. 20 and 21. Then, the request-source user VNAS 25A finishes the backup request reception subprogram 2321.

Figure 14:
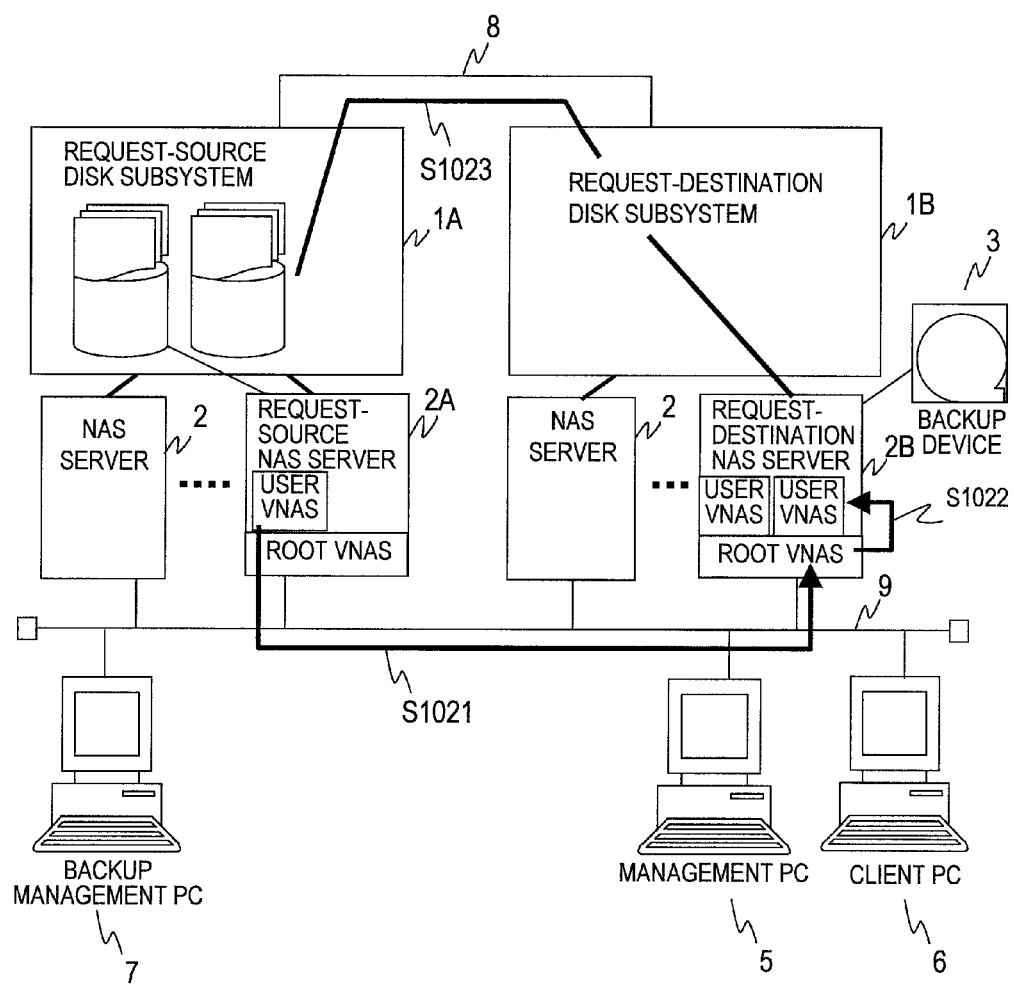
FIG. 14 describes the process by the environment construction request reception subprogram executed by the request-destination root VNAS according to the first embodiment of this invention.

FIG. 14 describes the process by the environment construction request reception subprogram 2331 executed by the request-destination root VNAS 26B according to the first embodiment of this invention.

The request-destination root VNAS 26B provided for the request-destination NAS server 2B receives the environment construction request from the request-source user VNAS 25A provided for the request-source NAS server 2A (S1021). Then, the request-destination root VNAS 26B produces a request-destination user VNAS 25B used to execute the backup process (S1022).

Then, the request-destination root VNAS 26B requests the request-destination disk subsystem 1B to produce a definition of a path which is an access route from the request-destination NAS server 2B to the sub volume provided for the request-source disk subsystem 1A. Then, the request-destination disk subsystem 1B produces a definition of the path which is an access route from the request-destination NAS server 2B to the sub volume provided for the request-source disk subsystem 1A (S1023).

Then, the request-destination root VNAS 26B requests the produced request-destination user VNAS 25B to execute the backup process.

Then, the request-destination root VNAS 26B waits until a notice of the completion of the backup process. The request-destination root VNAS 26B, upon being notified of the completion of the backup process, executes the environment post-process subprogram 2332. Then, the request-destination root VNAS 26B finishes the environment construction request reception subprogram 2331.

Figure 15:
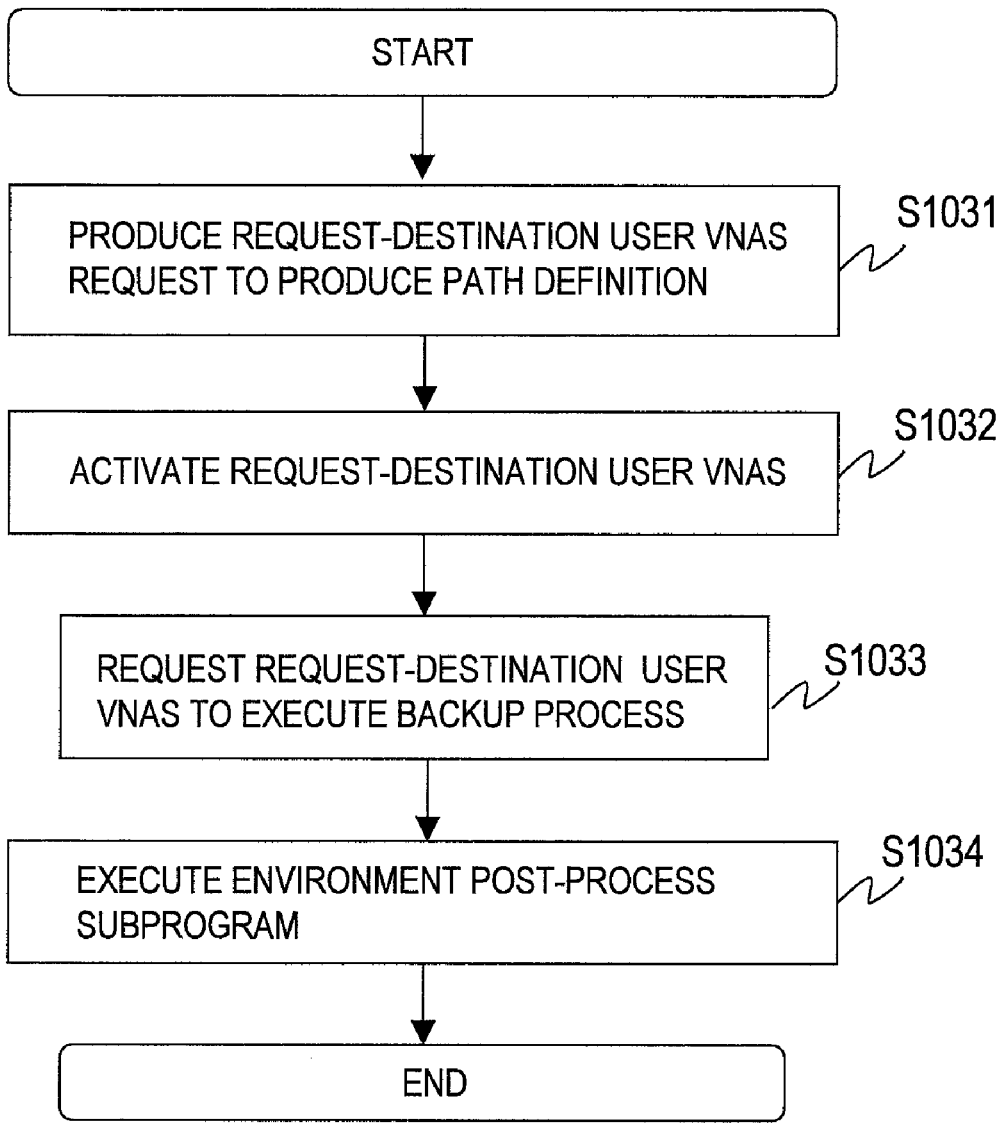
FIG. 15 is a flowchart of the process by the environment construction request reception subprogram executed by the request-destination root VNAS according to the first embodiment of this invention.

FIG. 15 is a flowchart of the process by the environment construction request reception subprogram 2331 executed by the request-destination root VNAS 26B according to the first embodiment of this invention.

The request-destination root VNAS 26B provided for the request-destination NAS server 2B, upon receiving the environment construction request from the request-source user VNAS 25A provided for the request-source NAS server 2A, executes the environment construction request reception subprogram 2331. First, the request-destination root VNAS 26B newly produces a request-destination user VNAS 25B for the backup process by allocating resources of the NAS server 2 to the request-destination user VNAS 25B.

Then, the request-destination root VNAS 26B requests the request-destination disk subsystem 1B to produce a definition of a path which is an access route from the request-destination NAS server 2B to the sub volume provided for the request-source disk subsystem 1A (S1031).

Then, the request-destination disk subsystem 1B stores the definition of the path which is an access route from the request-destination NAS server 2B to the sub volume provided for the request-source disk subsystem 1A in the path definition management table 133.

To be specific, the request-destination disk subsystem 1B produces a new record in the definition management table 133. Then, the request-destination disk subsystem 1B stores the name of the sub volume provided for the request-source disk subsystem 1A in the volume name 1331 of the new record. Then, the request-destination disk subsystem 1B stores an identifier of the request-destination NAS server 2B in the NAS ID 1332 of the new record.

As a result, the request-destination NAS server 2B can access the sub volume provided for the request-source disk subsystem 1A via the FC 8 and the request-destination disk subsystem 1B.

Then, the request-destination root VNAS 26B activates the produced request-destination user VNAS 25B (S1032).

Then, the request-destination root VNAS 26B requests the activated request-destination user VNAS 25B to execute the backup process (S1033). On this occasion, the request-destination root VNAS 26B transmits information on the sub volume provided for the request-source disk subsystems 1A to the activated request-destination user VNAS 25B.

Then, the request-destination user VNAS 25B executes the backup process subprogram 2323. It should be noted that a detailed description will be given of the process by the backup process subprogram 2323 with reference to FIGS. 16 and 17.

Then, the request-destination root VNAS 26B waits until a notice of the completion of the backup process. The request-destination root VNAS 26B, upon being notified of the completion of the backup process, executes the environment post-process subprogram 2332 (S1034). It should be noted that a detailed description will be given of the process by the environment post-process subprogram 2332 with reference to FIGS. 18 and 19. Then, the request-destination root VNAS 26B finishes the environment construction request reception subprogram 2331.

Figure 16:
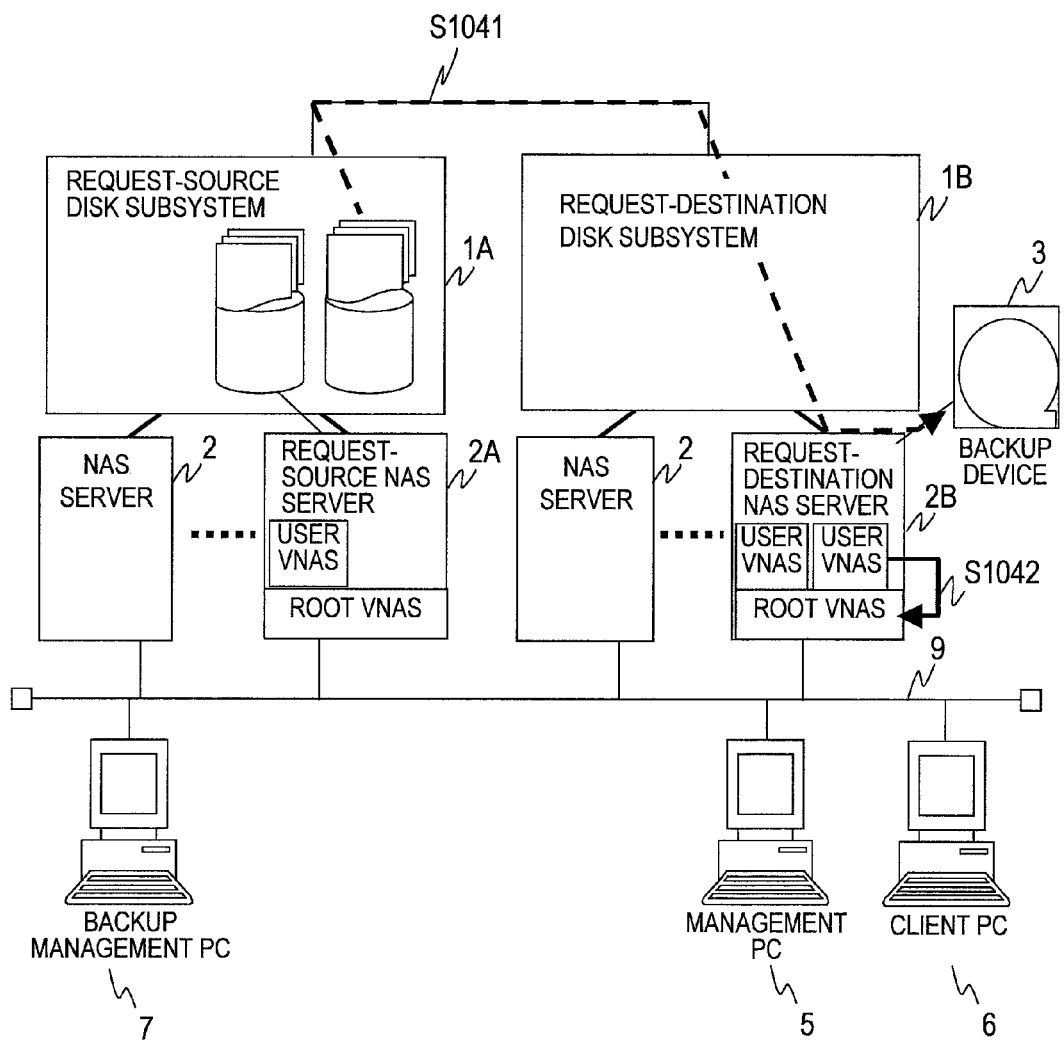
FIG. 16 describes the process by the backup process subprogram executed by the request-destination user VNAS according to the first embodiment of this invention.

FIG. 16 describes the process by the backup process subprogram 2323 executed by the request-destination user VNAS 25B according to the first embodiment of this invention.

The request-destination user VNAS 25B provided for the request-destination NAS server 2B is requested by the request-destination root VNAS 26B provided for the request-destination NAS server 2B to execute the backup process. Then, the request-destination user VNAS 25B backs up data stored in a sub volume provided for the request-source disk subsystem 1A to the backup device 3 (S1041).

Then, the request-destination user VNAS 25B notifies the request-destination root VNAS 26B of the completion of the backup process. Then, the request-destination user VNAS 25B finishes the backup process subprogram 2323.

Figure 17:
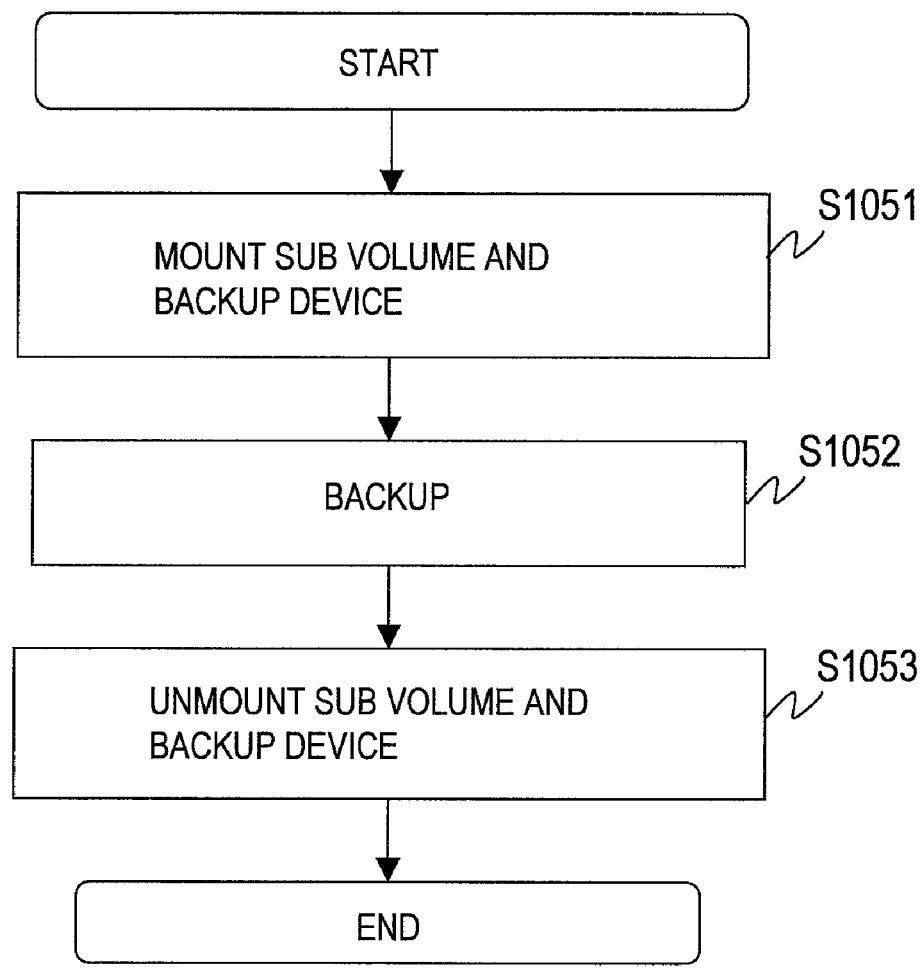
FIG. 17 is a flowchart of the process by the backup process subprogram executed by the request-destination user VNAS according to the first embodiment of this invention.

FIG. 17 is a flowchart of the process by the backup process subprogram 2323 executed by the request-destination user VNAS 25B according to the first embodiment of this invention.

The request-destination user VNAS 25B provided for the request-destination NAS server 2B, upon being requested by the request-destination root VNAS 26B provided for the request-destination NAS server 2B to execute the backup process, executes the backup process subprogram 2323.

First, the request-destination user VNAS 25B receives the information on the sub volume provided for the request-source disk subsystems 1A from the request-destination root VNAS 26B. Then, the request-destination user VNAS 25B refers to the received information on the sub volume to mount the sub volume provided for the request-source disk subsystem 1A. Further, the request-destination user VNAS 25B mounts the backup device 3 (S1051).

Then, the request-destination user VNAS 25B reads out data stored in the mounted sub volume. Then, the request-destination user VNAS 25B stores the read data in the mounted backup device 3. Consequently, the request-destination user VNAS 25B backs up the data stored in the sub volume to the backup device 3 (S1052). For example, the request-destination user VNAS 25B backs up the data stored in the sub volume to the backup device 3 by means of the technology described in JP 2005-533314 A.

The request-destination user VNAS 25B, after having completed the backup, unmounts the mounted sub volume and the mounted backup device 3 (S1053). Then, the request-destination user VNAS 25B notifies the request-destination root VNAS 26B of the completion of the backup process. Then, the request-destination root VNAS 26B executes the environment post-process subprogram 2332. It should be noted that a detailed description will be given of the process by the environment post-process subprogram 2332 with reference to FIGS. 18 and 19.

Then, the request-destination user VNAS 25B finishes the backup process subprogram 2323.

Figure 18:
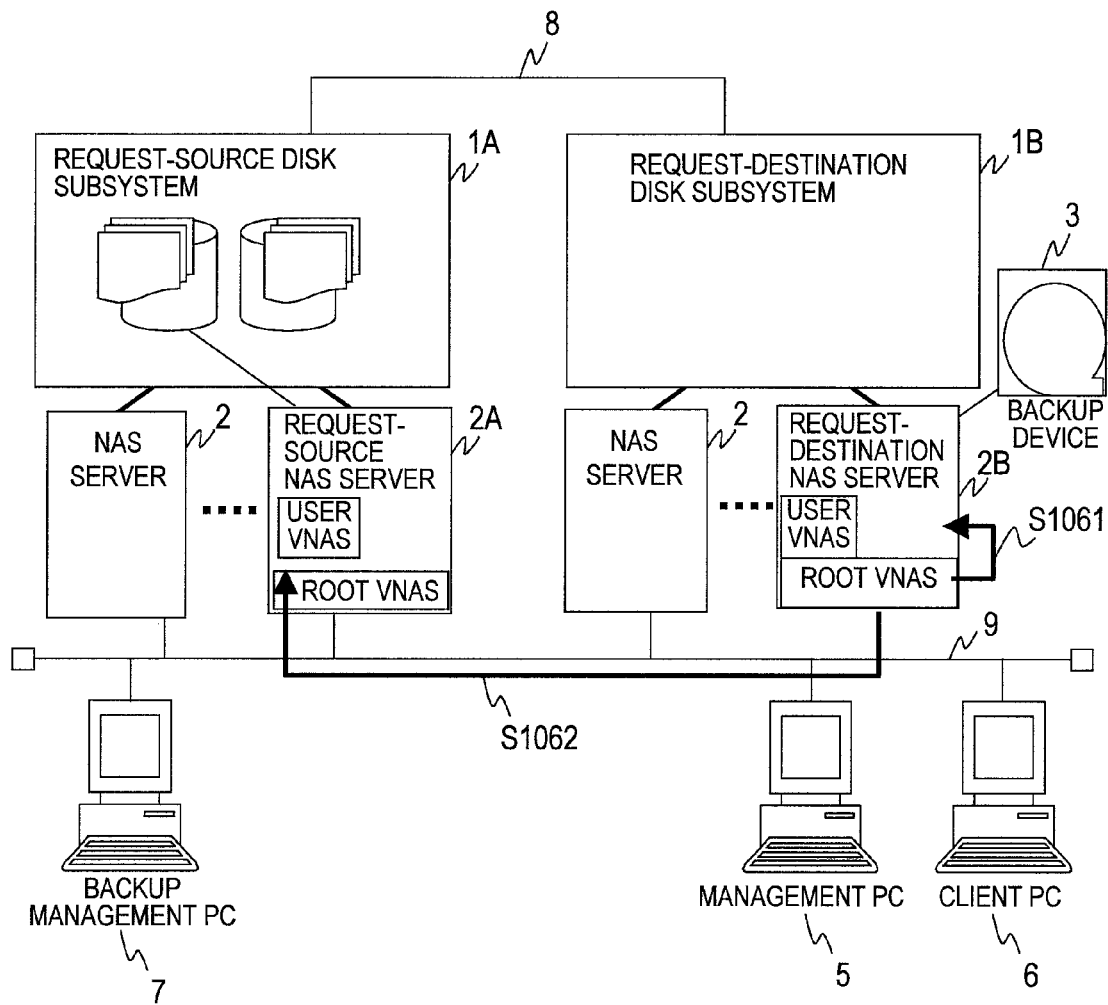
FIG. 18 describes the process by the environment post-process subprogram executed by the request-destination root VNAS according to the first embodiment of this invention.

FIG. 18 describes the process by the environment post-process subprogram 2332 executed by the request-destination root VNAS 26B according to the first embodiment of this invention.

The request-destination root VNAS 26B provided for the request-destination NAS server 2B is notified by the request-destination user VNAS 25B provided for the request-destination NAS server 2B of the completion of the backup process. Then, the request-destination root VNAS 26B deletes the request-destination user VNAS 25B (S1061). Then, the request-destination root VNAS 26B transmits a backup completion notice to the request-source user VNAS 25A provided for the request-source NAS server 2A (S1062). Then, the request-destination root VNAS 26B finishes the environment post-process subprogram 2332.

Figure 19:
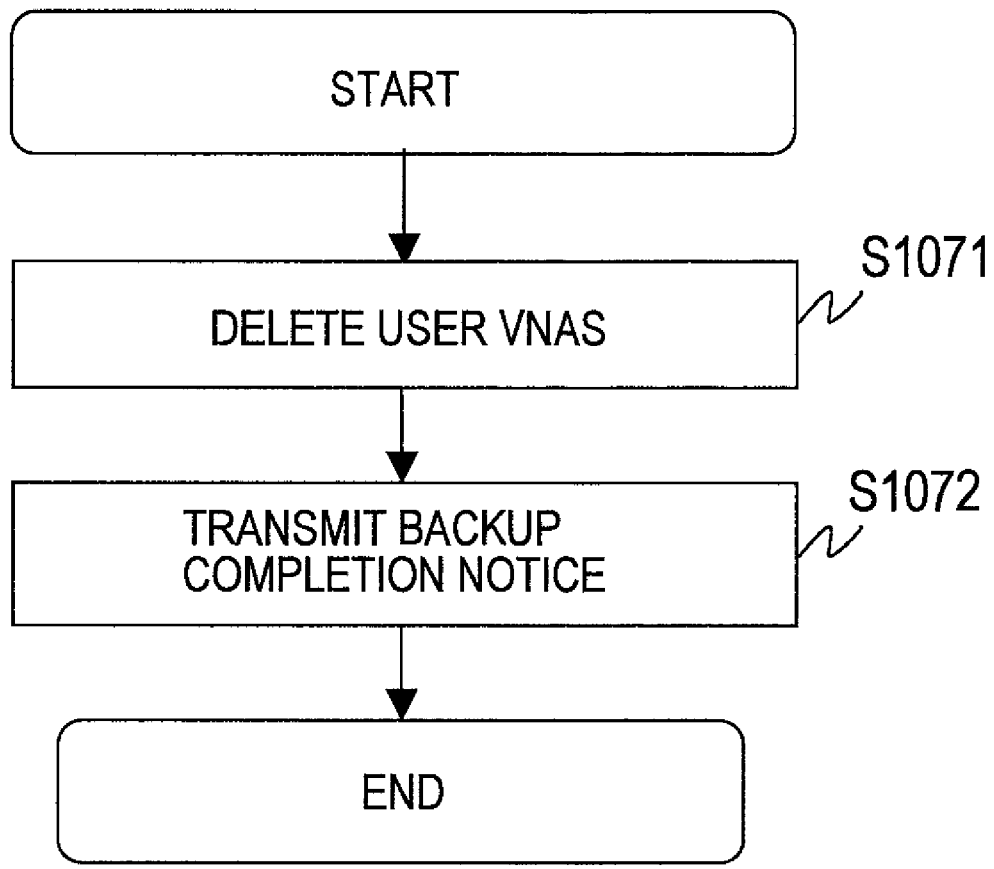
FIG. 19 is a flowchart of the process by the environment post-process subprogram executed by the request-destination root VNAS according to the first embodiment of this invention.

FIG. 19 is a flowchart of the process by the environment post-process subprogram 2332 executed by the request-destination root VNAS 26B according to the first embodiment of this invention.

The request-destination root VNAS 26B provided for the request-destination NAS server 2B, upon being notified by the request-destination user VNAS 25B provided for the request-destination NAS server 2B of the completion of the backup process, executes the environment post-process subprogram 2332.

First, the request-destination root VNAS 26B stops the operation of the request-destination user VNAS 25B, which is the source of the notice of the backup completion. Then, the request-destination root VNAS 26B frees the resources of the request-destination NAS server 2B allocated to the request-destination user VNAS 25B whose operation has stopped. Then, the request-destination root VNAS 26B deletes the request-destination user VNAS 25B (S1071).

Then, the request-destination root VNAS 26B transmits a backup completion notice to the request-source user VNAS 25A provided for the request-source NAS server 2A (S1072).

The request-source user VNAS 25A, upon receiving the backup completion notice, executes the environment restore process subprogram 2322. It should be noted that a detailed description will be given of the process by the environment restore process subprogram 2322 with reference to FIGS. 20 and 21.

Then, the request-destination root VNAS 26B finishes the environment post-process subprogram 2332.

Figure 20:
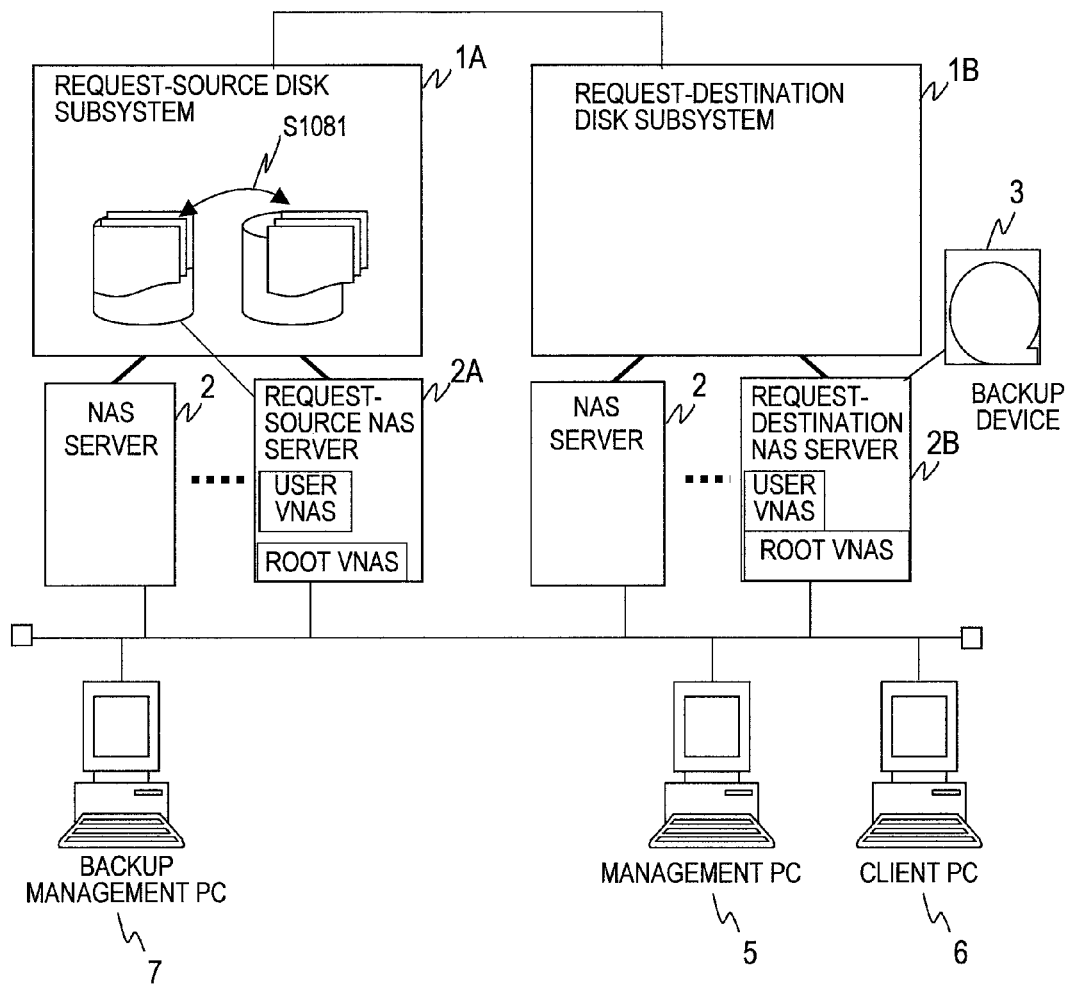
FIG. 20 describes the process by the environment restore process subprogram executed by the request-source user VNAS according to the first embodiment of this invention.

FIG. 20 describes the process by the environment restore process subprogram 2322 executed by the request-source user VNAS 25A according to the first embodiment of this invention.

The request-source user VNAS 25A provided for the request-source NAS server 2A receives a backup completion notice from the request-destination root VNAS 26B provided for the request-destination NAS server 2B. Then, the request-source user VNAS 25A restores the environment of the request-source disk subsystem 1A to a state upon receiving a backup request. For example, the request-source user VNAS 25A sets a mirroring environment to the request-source disk subsystem 1A (S1081).

Then, the request-source user VNAS 25A finishes the environment restore process subprogram 2322.

Figure 21:
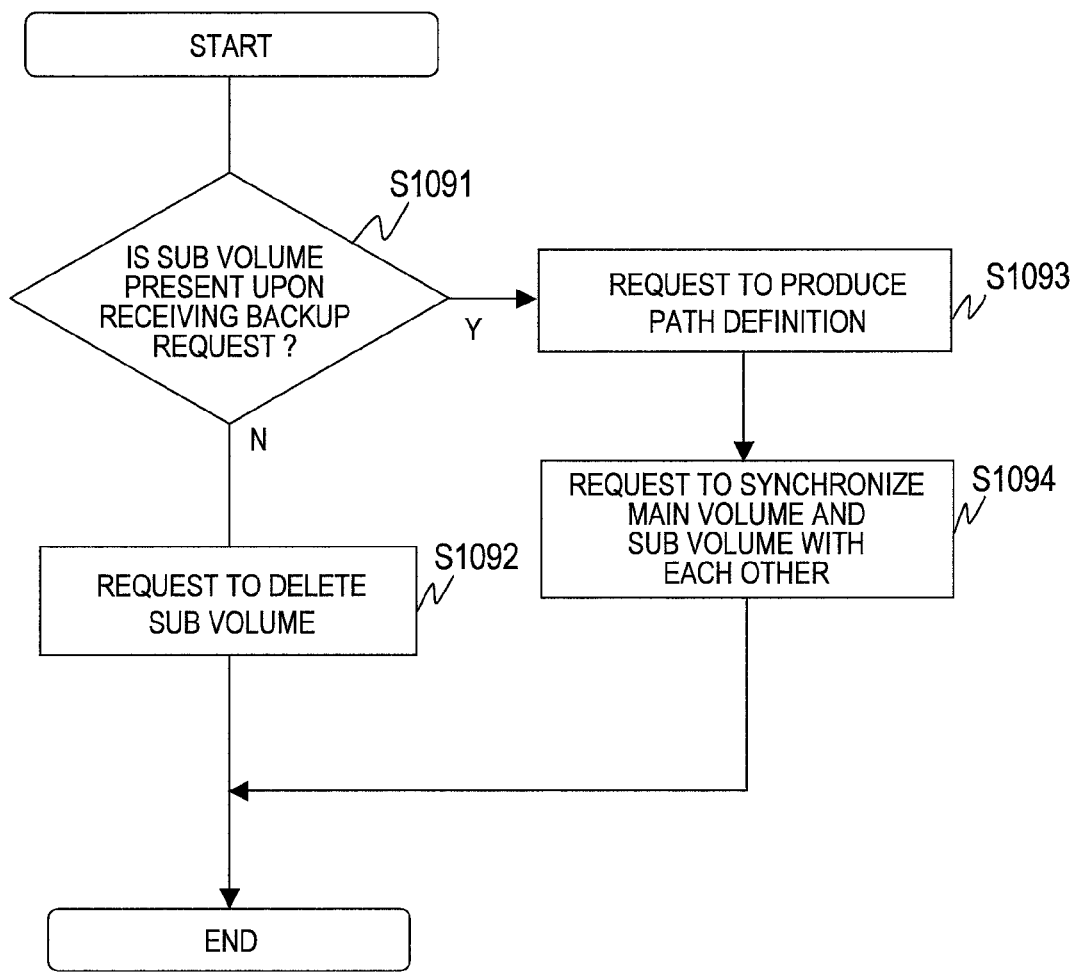
FIG. 21 is a flowchart of the process by the environment restore process subprogram executed by the request-source user VNAS according to the first embodiment of this invention.

FIG. 21 is a flowchart of the process by the environment restore process subprogram 2322 executed by the request-source user VNAS 25A according to the first embodiment of this invention.

The request-source user VNAS 25A provided for the request-source NAS server 2A, upon receiving a backup completion notice from the request-destination root VNAS 26B provided for the request-destination NAS server 2B, executes the environment restore process subprogram 2322.

First, the request-source user VNAS 25A refers to the event log 134 stored in the request-source disk subsystem 1A to identify an environment of the request-source disk subsystem 1A upon receiving a back up request. Then, the request-source user VNAS 25A determines whether a sub volume was present upon receiving the backup request (S1091).

For example, the request-source user VNAS 25A determines that a sub volume was not present upon receiving the backup request if the backup request reception subprogram 2321 determines that a sub volume is not present in the step S1011 of the process thereof.

Then, the request-source user VNAS 25A requests the request-source disk subsystem 1A to delete a sub volume produced in the step S1012 of the process by the backup request reception subprogram 2321.

Then, the request-source disk subsystem 1A deletes the sub volume (S1092). On this occasion the request-source disk subsystem 1A updates the mirroring setting management table 135.

To be specific, the request-source disk subsystem 1A deletes a record whose volume name 1351 coincides with the name of the deleted sub volume name from the mirroring setting management table 135.

Then, the request-source disk subsystem 1A selects the record whose volume name 1351 coincides with the name included in the backup request from the mirroring setting management table 135. Then, the request-source disk subsystem 1A stores "No" in the mirroring setting 1352 of the selected record. Then, the request-source disk subsystem 1A stores "Independent Volume" in the volume type 1353 of the selected record. Then, the request-source disk subsystem 1A deletes the value of the paired volume name 1354 of the selected record.

Then, the request-source disk subsystem 1A stores the deletion of the volume as an event in the event log 134. Then, the request-source user VNAS 25A finishes the environment restore process subprogram 2322.

On the other hand, the request-source user VNAS 25A determines that a sub volume was present upon receiving the backup request if the backup request reception subprogram 2321 determines that a sub volume is present in the step S1011 of the process thereof.

Then, the request-source user VNAS 25A requests the request-source disk subsystem 1A to produce a path definition which is an access route to the sub volume (S1093). Then, the request-source disk subsystem 1A stores the definition of the path, which is the access route to the sub volume, in the path definition management table 133.

To be specific, the request-source user VNAS 25A stores the path definition deleted in the step S1016 of the backup request reception subprogram 2321 in the path definition management table 133.

Then, the request-source user VNAS 25A requests the request-source disk subsystem 1A to synchronize the main volume and the sub volume with each other (S1094). Then, the request-source disk subsystem 1A synchronizes the main volume and the sub volume with each other by means of mirroring. As a result, data in the main volume and data in the sub volume become the same. On this occasion, the request-source disk subsystem 1A updates the mirroring setting management table 135.

To be specific, the request-source disk subsystem 1A selects the record whose volume name 1351 coincides with the name of the main volume from the mirroring setting management table 135. Then, the request-source disk subsystem 1A stores "Yes" in the mirroring setting 1352 of the selected record. Then, the request-source disk subsystem 1A selects the record whose volume name 1351 coincides with the sub volume name from the mirroring setting management table 135. Then, the request-source disk subsystem 1A stores "Yes" in the mirroring setting 1352 of the selected record.

Then, the request-source user VNAS 25A finishes the environment restore process subprogram 2322.

Figure 22:
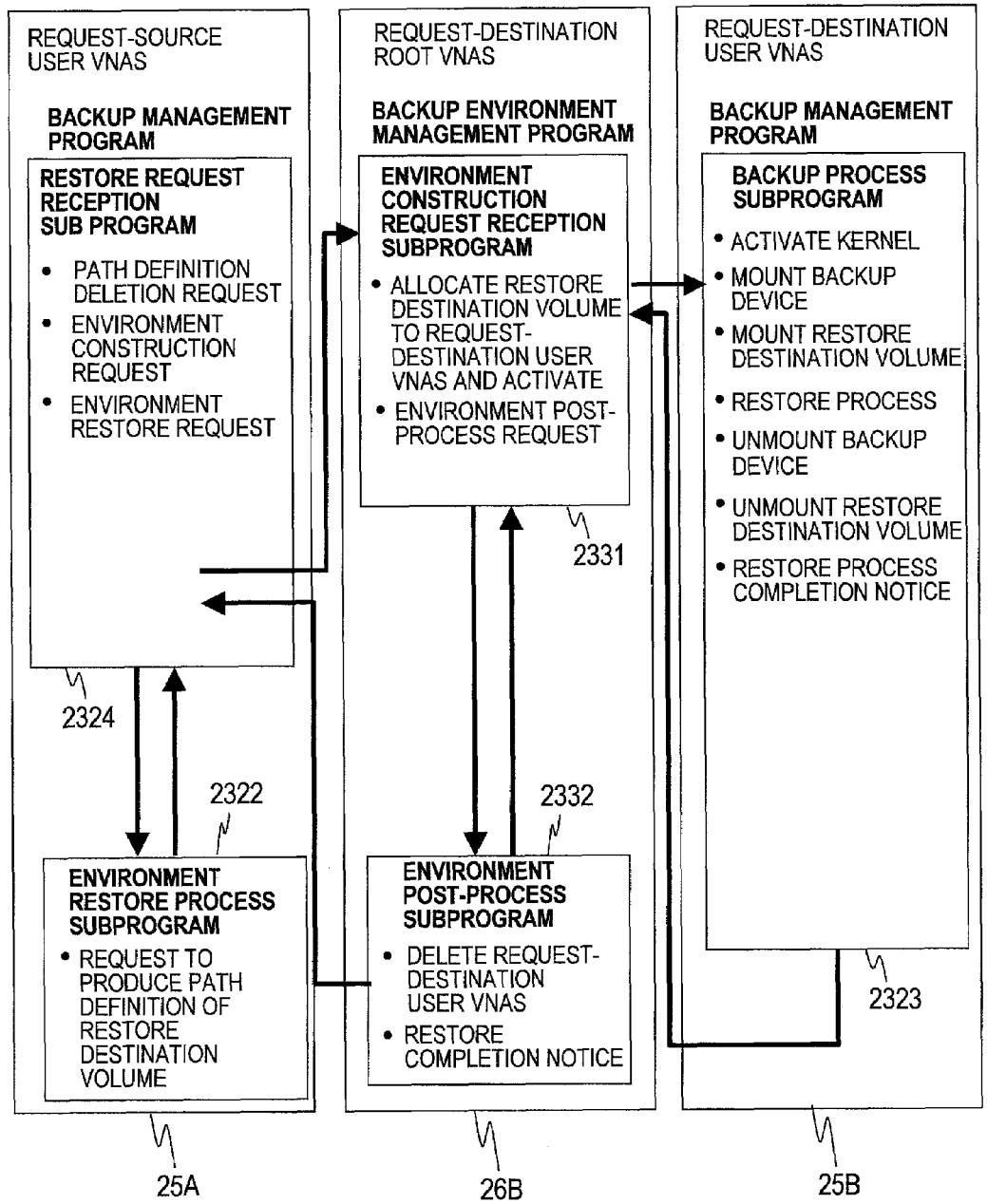
FIG. 22 describes an overview of the restore request execution process executed by the computer system according to the first embodiment of this invention.

FIG. 22 describes an overview of the restore request execution process executed by the computer system according to the first embodiment of this invention.

First, the management computer 5, upon an operation of the administrator or the like, instructs the backup management computer 7 to restore data stored in the request-source subsystem 1A. The backup management computer 7, upon receiving the instruction of the restore, transmits a request for the restore to the request-source user VNAS 25A provided for the request-source NAS server 2A.

The restore request reception subprogram 2324 of the request-source user VNAS 25A receives the restore request from the backup management computer 7. Then, the restore request reception subprogram 2324 carries out a request to delete a path definition and the like. Then, the restore request reception subprogram 2324 transmits an environment construction request to the environment construction request reception subprogram 2331 of the request-destination root VNAS 26B. It should be noted that a detailed description will be given of the process by the restore request reception subprogram 2324 with reference to FIG. 23.

The environment construction request reception subprogram 2331 of the request-destination root VNAS 26B, upon receiving the environment construction request, produces a request-destination user VNAS 25B. Then, the environment construction request reception subprogram 2331 allocates a restore-destination volume which is an LU 15 to which data to be restored is stored to the produced request-destination user VNAS 25B. Then, the environment construction request reception subprogram 2331 activates the produced request-destination user VNAS 25B. Then, the environment construction request reception subprogram 2331 requests the backup process subprogram 2323 of the activated request-destination user VNAS 25B to execute the restore process. It should be noted that the process by the environment construction request reception subprogram 2331 during the restore is the same as the process described with reference to FIGS. 14 and 15 except that the execution of the restore process is requested instead of the backup process. Therefore, a detailed description thereof is omitted.

The backup process subprogram 2323 of the request-destination user VNAS 25B, upon receiving the request to execute the restore process, carries out a kernel activation, a mount of the backup device 3, a mount of the allocated restore-destination volume, the restore process, an unmount of the backup device 3, and an unmount of the allocated restore-destination volume. Then, the backup process subprogram 2323 notifies the environment construction request reception subprogram 2331 of the request-destination root VNAS 26B of the completion of the restore process. It should be noted that a detailed description will be given of the process by the backup process subprogram 2323 with reference to FIG. 24.

The environment construction request reception subprogram 2331 of the request-destination root VNAS 26B, upon being notified of the completion of the restore process, requests the environment post-process subprogram 2332 of the request-destination root VNAS 26B to execute the environment post-process.

The environment post-process subprogram 2332 of the request-destination root VNAS 26B, upon being requested to execute the environment post-process, deletes the request-destination user VNAS 25B. Then, the environment post-process subprogram 2332 transmits a restore completion notice to the restore request reception subprogram 2324 of the request-source user VNAS 25A. It should be noted that a process by the environment post-process subprogram 2332 during the restore is the same as the process described with reference to FIGS. 18 and 19 except that the restore completion notice is transmitted instead of the backup completion notice. Therefore, a detailed description thereof is omitted.

The restore request reception subprogram 2324 of the request-source user VNAS 25A, upon receiving the restore completion notice, requests the environment restore process subprogram 2322 of the request-source user VNAS 25A to execute the environment restore process.

The environment restore process subprogram 2322 of the request-source user VNAS 25A, upon being requested to execute the environment restore process, requests to construct a definition of a path to a restore destination volume. It should be noted that the process by the environment restore process subprogram 2322 is the same as the process described with reference to FIGS. 20 and 21 except that the request to construct the definition of the path to the restore destination volume is requested instead of the path to the sub volume. Therefore, a detailed description thereof is omitted.

As described above, when the request-source NAS server 2A receives a restore request, the request-source NAS server 2A and the request-destination NAS server 2B cooperate to construct the environment required to execute the restore. Then, the request-destination NAS server 2B restores data to be stored in the request-source disk subsystem 1A, which is not locally coupled to the backup device 3.

Figure 23:
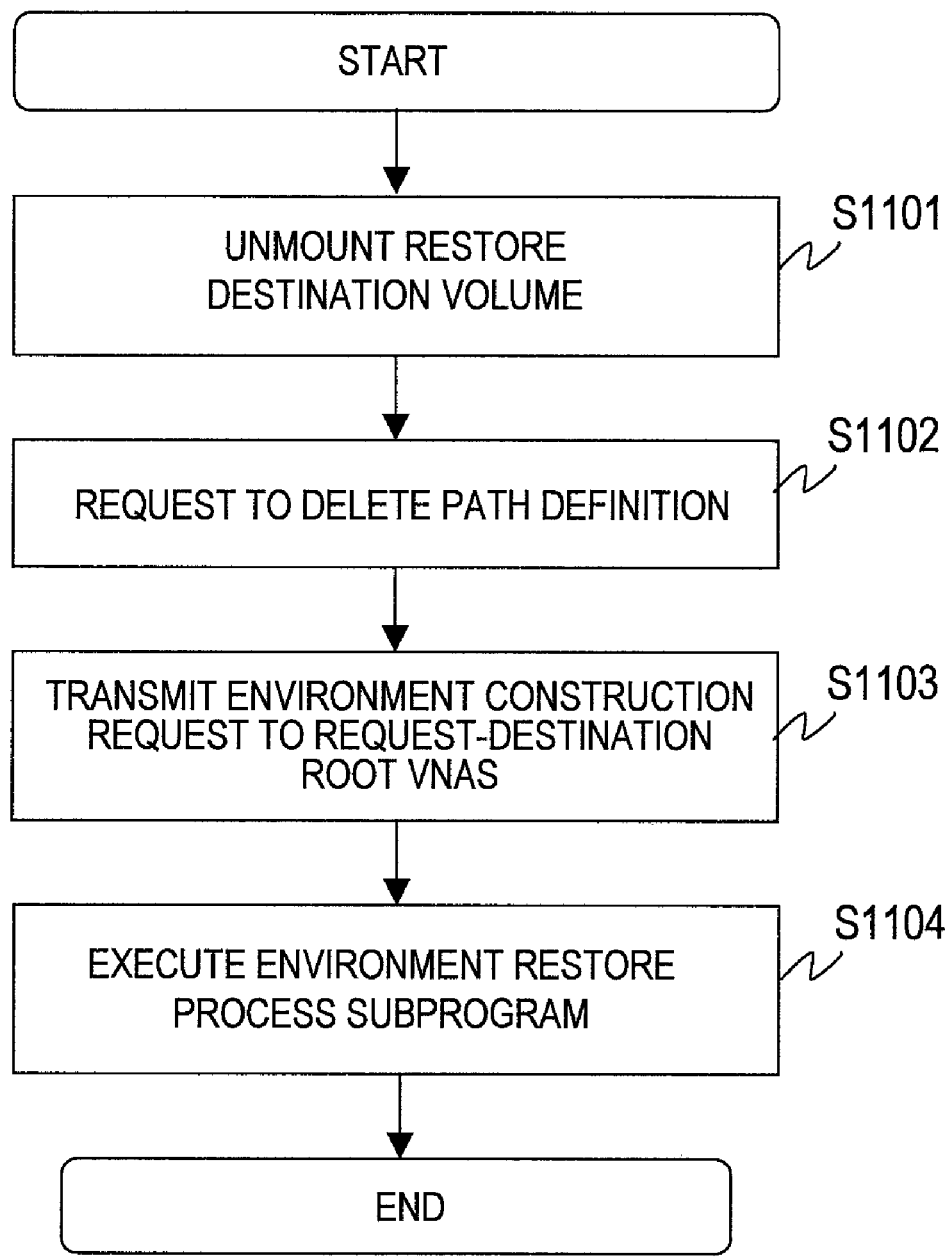
FIG. 23 is a flowchart of the process by the restore request reception subprogram executed by the request-source user VNAS according to the first embodiment of this invention.

FIG. 23 is a flowchart of the process by the restore request reception subprogram 2324 executed by the request-source user VNAS 25A according to the first embodiment of this invention.

The request-source user VNAS 25A, upon receiving a restore request from the backup management computer 7, executes the restore request reception subprogram 2324. It should be noted that the restore request includes the name of an LU 15 (restore destination volume) in which the restore data is to be stored.

First, the request-source user VNAS 25A unmounts the restore destination volume (S1101). Then, the request-source user VNAS 25A requests the request-source disk subsystem 1A to delete a path definition which is the access route to the restore destination volume (S1102). Then, the request-source disk subsystem 1A deletes the definition of the path, which is the access route to the restore destination volume, from the path definition management table 133.

To be specific, the request-source disk subsystem 1A deletes a record whose volume name 1331 coincides with the name of the restore-destination volume from the path definition management table 133.

Then, the request-source user VNAS 25A transmits an environment construction request to the request-destination root VNAS 26B provided for the request-destination NAS server 2B (S1103). For this purpose, the request-source user VNAS 25A stores network information on the request-destination root VNAS 26B provided for the request-destination NAS server 2B locally coupled to the backup device 3.

Then, the request-source user VNAS 25A waits until the reception of a restore completion notice from the request-destination root VNAS 26B. The request-source user VNAS 25A, upon receiving a restore completion notice, executes the environment restore process subprogram 2322 (S1104). Then, the request-source user VNAS 25A finishes the restore request reception subprogram 2324.

Figure 24:
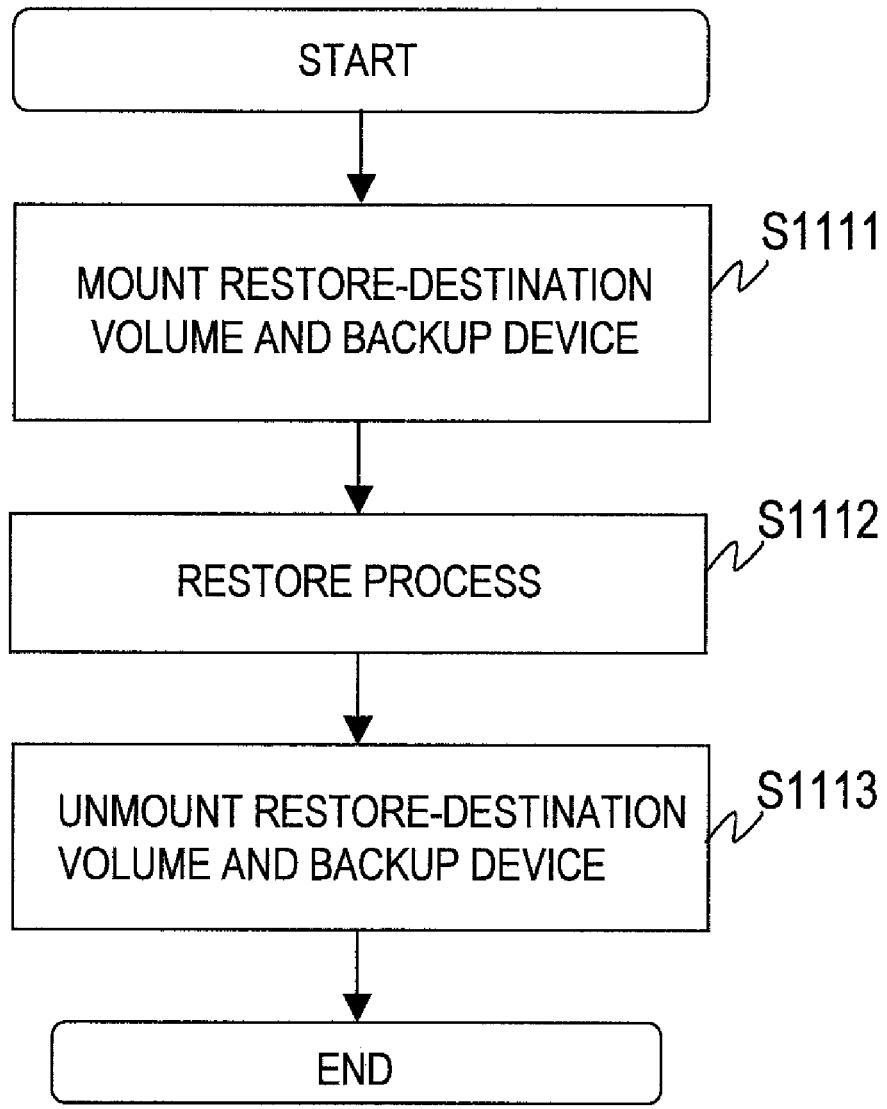
FIG. 24 is a flowchart of the process by the backup process subprogram executed during the restore by the request-destination user VNAS according to the first embodiment of this invention.

FIG. 24 is a flowchart of the process by the backup process subprogram 2323 executed during the restore by the request-destination user VNAS 25B according to the first embodiment of this invention.

The request-destination user VNAS 25B provided for the request-destination NAS server 2B, upon being requested by the request-destination root VNAS 26B provided for the request-destination NAS server 2B to execute the restore process, executes the backup process subprogram 2323.

First, the request-destination user VNAS 25B receives information on the restore destination volume provided for the request-source disk subsystems 1A from the request-destination root VNAS 26B. Then, the request-destination user VNAS 25B refers to the received information on the restore-destination volume to mount the restore-destination volume provided for the request-source disk subsystem 1A. Further, the request-destination user VNAS 25B mounts the backup device 3 (S1111).

Then, the request-destination user VNAS 25B reads out data stored in the mounted backup device 3. Then, the request-destination user VNAS 25B stores the read data in the mounted restore-destination volume. As a result, the request-destination user VNAS 25B restores the data to be stored in the restore-destination volume (S1112).

The request-destination user VNAS 25B, after having completed the restore, unmounts the mounted restore-destination volume and the mounted backup device 3 (S1053). Then, the request-destination user VNAS 25B notifies the request-destination root VNAS 26B of the completion of the restore process. Then, the request-destination user VNAS 25B finishes the backup process subprogram 2323.

As described above, according to this embodiment, data stored in the request-source disk subsystem 1A, which is not locally coupled to the backup device 3, can be backed up to the backup device 3. Further, data to be stored in the request-source disk subsystem 1A, which is not locally coupled to the back up device 3, can be restored by means of backed up data stored in the backup device 3.

According to this embodiment, upon the backup and restore, backup data is not transported on the LAN 9. As a result, the backup data does not places a burden on the communication between the client computer 6 and the NAS servers 2. Thus, the NAS servers 2 can provide the client computer 6 with the file sharing service without adverse effect of the backup process and the restore process.

Further, according to this embodiment, in order to execute the backup process or the restore process, a request-destination user VNAS 25B is produced on the request-destination NAS server 2B. That is, the user VNAS 25B, which is different from the usual user VNAS 25 providing the file sharing service, executes the backup process and the restore process. Therefore, security of the backup process and the restore process increases.

Second Embodiment

According to the first embodiment, the mirroring environment setting by the request-source user VNAS 25A, the synchronization process for the mirroring by the request-source user VNAS 25A, the activation process of the request-destination user VNAS 25B by the request-destination root VNAS 26B, the backup process by the request-destination user VNAS 25B, and the like are sequentially executed. On the other hand, according to a second embodiment, the synchronization process for the mirroring by the request-source user VNAS 25A and the activation process of the request-destination user VNAS 25B by the request-destination root VNAS 26B are executed in parallel.

The configuration of the computer system according to the second embodiment is the same as that of the computer system according to the first embodiment shown in FIG. 1, and description thereof will be omitted.

Figure 25:
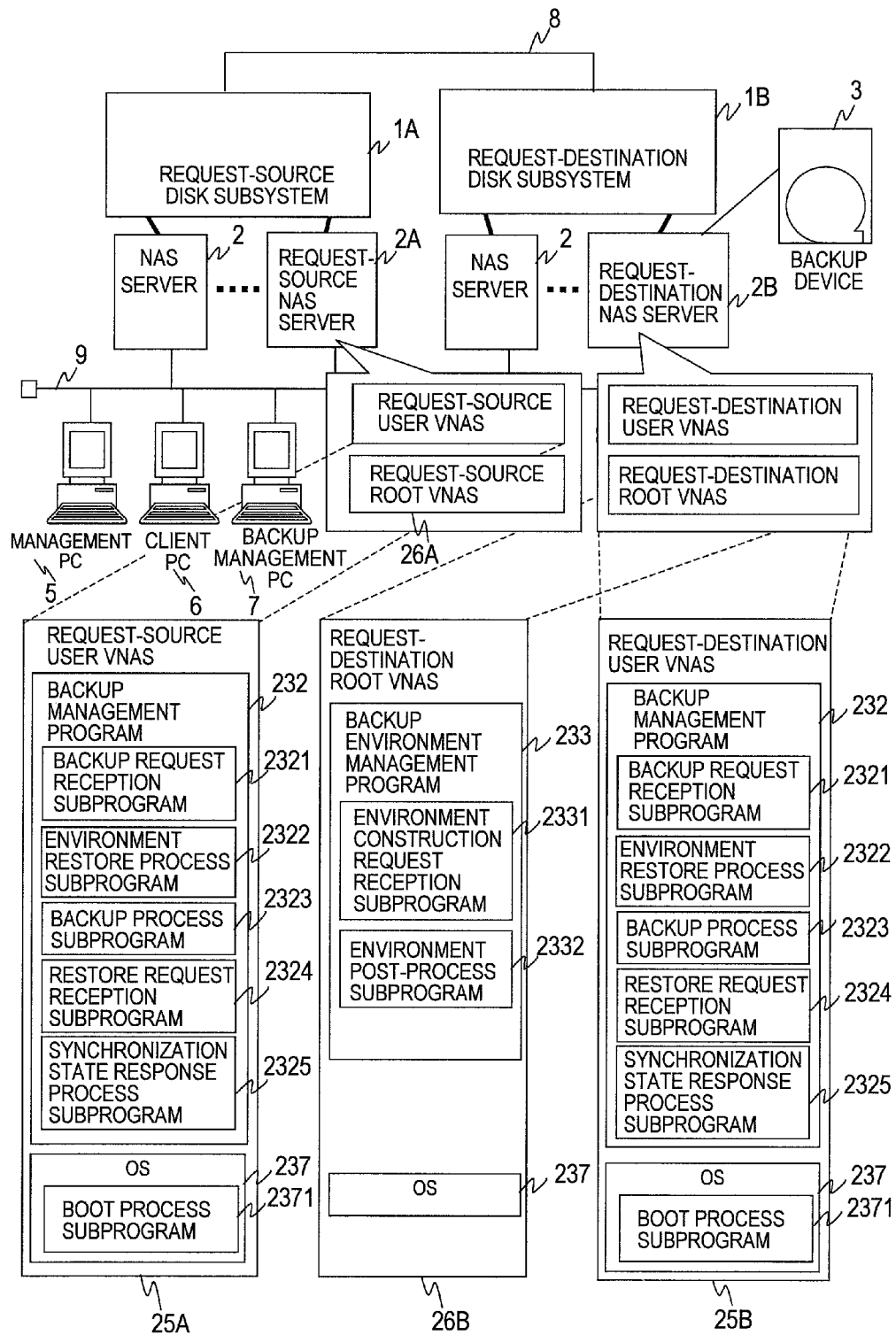
FIG. 25 describes the user VNAS's and the root VNAS's in the computer system according to the second embodiment of this invention.

FIG. 25 describes the user VNAS's and the root VNAS's in the computer system according to the second embodiment of this invention.

The request-source NAS server 2A includes the request-source user VNAS 25A and the request-source root VNAS 26A. Further, the request-destination NAS server 2B includes the request-destination root VNAS 26B. Further, in the course of the backup process, a request-destination user VNAS 25B is produced in the request-destination NAS server 2B.

The request-source VNAS 25A and the request-destination user VNAS 25B include the backup management program 232 and the OS 237. The backup management program 232 includes the backup request reception subprogram 2321, the environment restore process subprogram 2322, the backup process subprogram 2323, the restore request reception subprogram 2324, and a synchronization state response process subprogram 2325.

The backup request reception subprogram 2321, the environment restore process subprogram 2322, the backup process subprogram 2323, and the restore request reception subprogram 2324 are the same as those included in the user VNAS 25 according to the first embodiment, and a description thereof, therefore, is omitted.

The synchronization state response process subprogram 2325 receives a synchronization state confirmation request from the request-destination user VNAS 25B provided for the request-destination NAS server 2B. Then, the synchronization state response process subprogram 2325 determines whether a main volume and a sub volume provided for the request-source disk subsystem 1A are synchronized with each other, and returns a result of the determination to the request-destination user VNAS 25B. It should be noted that the synchronization state response process subprogram 2325 is executed on the request-source user VNAS 25A.

The OS 237 includes a boot process subprogram 2371. The boot process subprogram 2371 activates the backup management program 232. It should be noted that the boot process subprogram 2371 is executed on the request-destination user VNAS 25B.

The request-destination root VNAS 26B includes the backup environment management program 233 and the OS 237. The backup environment management program 233 and the OS 237 are the same as those included in the request-destination root VNAS according to the first embodiment, and a description thereof, therefore, is omitted.

Figure 26:
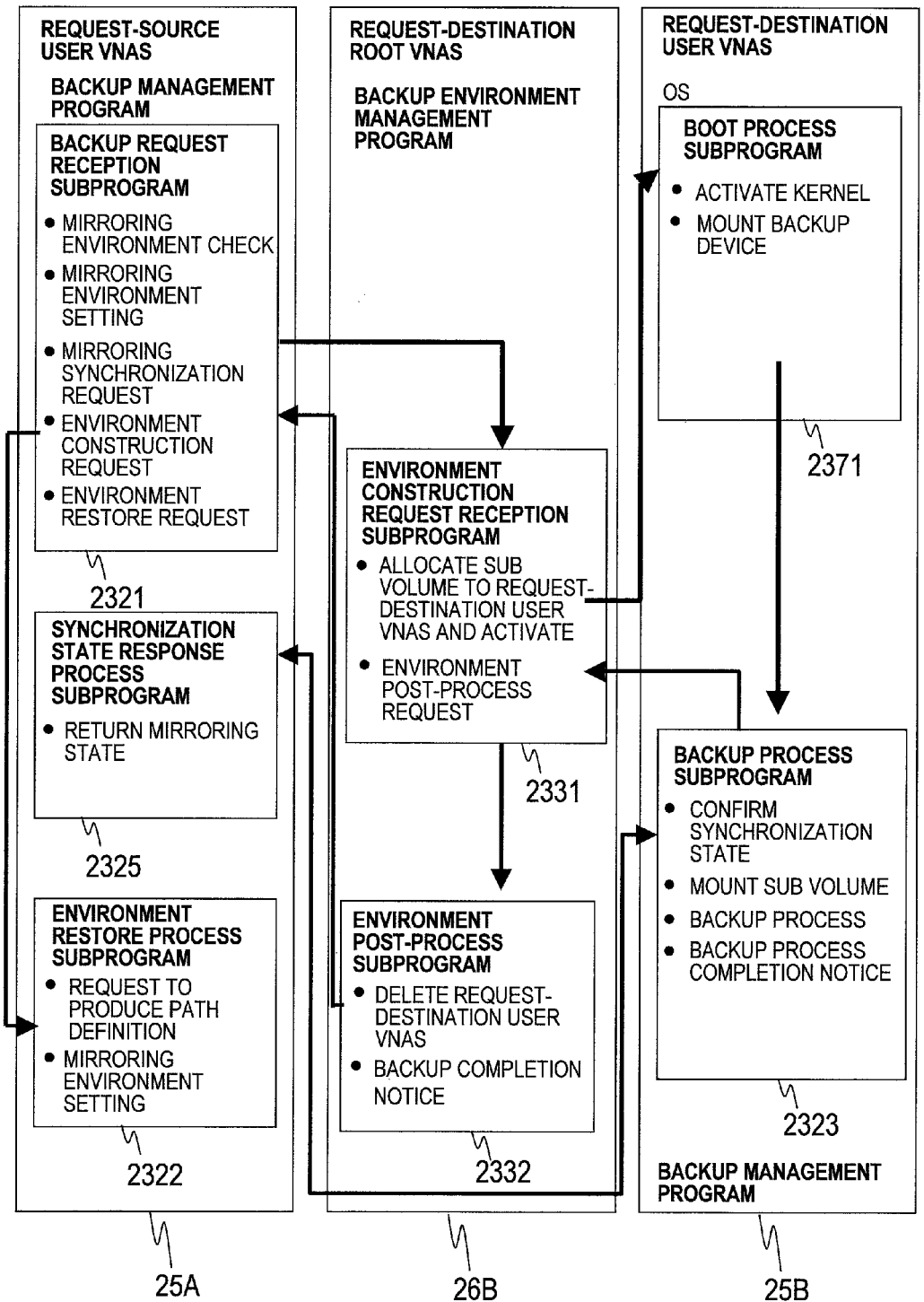
FIG. 26 describes an overview of a backup request execution process executed by the computer system according to the second embodiment of this invention.

FIG. 26 describes an overview of a backup request execution process executed by the computer system according to the second embodiment of this invention.

First, the backup request reception subprogram 2321 of the request-source user VNAS 25A receives a backup request from the backup management computer 7. Then, the backup request reception subprogram 2321 carries out the mirroring environment check, the mirroring environment setting, and the mirroring synchronization request. Then, the backup request reception subprogram 2321 transmits an environment construction request to the environment construction request reception subprogram 2331 of the request-destination root VNAS 26B. That is, the backup request reception subprogram 2321 transmits an environment construction request to the environment construction request reception subprogram 2331 of the request-destination root VNAS 26B without confirming the completion of the synchronization between the main volume and the sub volume.

It should be noted that a process by the backup request reception subprogram 2321 according to the second embodiment is the same as the process shown in FIGS. 12 and 13 of the backup request reception subprogram according to the first embodiment except that the mirroring synchronization release request and the path definition deletion request are not carried out. A detailed description of the backup request reception subprogram 2321 according to the second embodiment, therefore, is omitted.

The environment construction request reception subprogram 2331 of the request-destination root VNAS 26B, upon receiving the environment construction request, produces a request-destination user VNAS 25B. Then, the environment construction request reception subprogram 2331 allocates a sub volume to the produced request-destination user VNAS 25B. Then, the environment construction request reception subprogram 2331 activates the produced request-destination user VNAS 25B.

It should be noted that a process by the environment construction request reception subprogram 2331 according to the second embodiment is the same as the process shown in FIGS. 14 and 15 by the environment construction request reception subprogram according to the first embodiment. A detailed description of the environment construction request reception subprogram 2331 according to the second embodiment, therefore, is omitted.

The request-destination user VNAS 25B, upon being activated, executes the boot process subprogram 2371. The boot process subprogram 2371 activates the kernel, and mounts the backup device 3. The boot process subprogram 2371 activates the backup process subprogram 2323. It should be noted that a detailed description will be given of the process by the boot process subprogram 2371 with reference to FIG. 28.

The backup process subprogram 2323 of the request-destination user VNAS 25B, upon being activated, transmits a synchronization state confirmation request in order to confirm whether the main volume and the sub volume have been synchronized to the synchronization state response subprogram 2325 of the request-source user VNAS 25A.

The synchronization state response subprogram 2325 of the request-source user VNAS 25A receives the synchronization state confirmation request. Then, the backup process subprogram 2323 checks the synchronization state between the main volume and the sub volume, and determines whether the main volume and the sub volume have been synchronized with each other. Then, the backup process subprogram 2323 returns a result of the determination to the backup process subprogram 2323 of the request-destination user VNAS 25B. It should be noted that a detailed description will be given of the process by the synchronization state response subprogram 2325 with reference to FIG. 27.

Then, the request-destination user VNAS 25B, upon confirming that the synchronization has been completed, carries out the mount of the sub volume, the backup process, the unmount of the backup device 3, and the unmount of the sub volume. Then, the backup process subprogram 2323 notifies the environment construction request reception subprogram 2331 of the request-destination root VNAS 26B of the completion of the backup process. It should be noted that a detailed description will be given of the process by the backup process subprogram 2323 with reference to FIG. 29.

The environment construction request reception subprogram 2331 of the request-destination root VNAS 26B, upon being notified of the completion of the backup process, requests the environment post-process subprogram 2332 of the request-destination root VNAS 26B to execute the environment post-process.

The environment post-process subprogram 2332 of the request-destination root VNAS 26B, upon being requested to execute the environment post-process, deletes the request-destination user VNAS 25B. Then, the environment post-process subprogram 2332 transmits a backup completion notice to the backup request reception subprogram 2321 of the request-source user VNAS 25A. It should be noted that a process by the environment post-process subprogram 2332 according to the second embodiment is the same as the process shown in FIGS. 18 and 19 by the environment post-process subprogram according to the first embodiment. A detailed description of the environment post-process subprogram 2332 according to the second embodiment, therefore, is omitted.

The backup request reception subprogram 2321 of the request-source user VNAS 25A, upon receiving the backup completion notice, requests the environment restore process subprogram 2322 of the request-source user VNAS 25A to execute the environment restore process.

The environment restore process subprogram 2322 of the request-source user VNAS 25A, upon being requested to execute the environment restore process, executes the request to construct a definition of a path and the mirroring environment setting. It should be noted that a process by the environment restore process subprogram 2322 according to the second embodiment is the same as the process shown in FIGS. 20 and 21 by the environment restore process subprogram according to the first embodiment. A detailed description of the environment restore process subprogram 2322 according to the second embodiment, therefore, is omitted.

As described above, when the request-source NAS server 2A receives a backup request, the request-source NAS server 2A and the request-destination NAS server 2B cooperate to construct the environment required to execute the backup. On this occasion, the synchronization process for the mirroring by the request-source user VNAS 25A and the activation process of the request-destination user VNAS 25B by the request-destination root VNAS 26B are executed in parallel. Then, the request-destination NAS server 2B backs up data stored in the request-source disk subsystem 1A, which is not locally coupled to the backup device 3, to the backup device 3.

Figure 27:
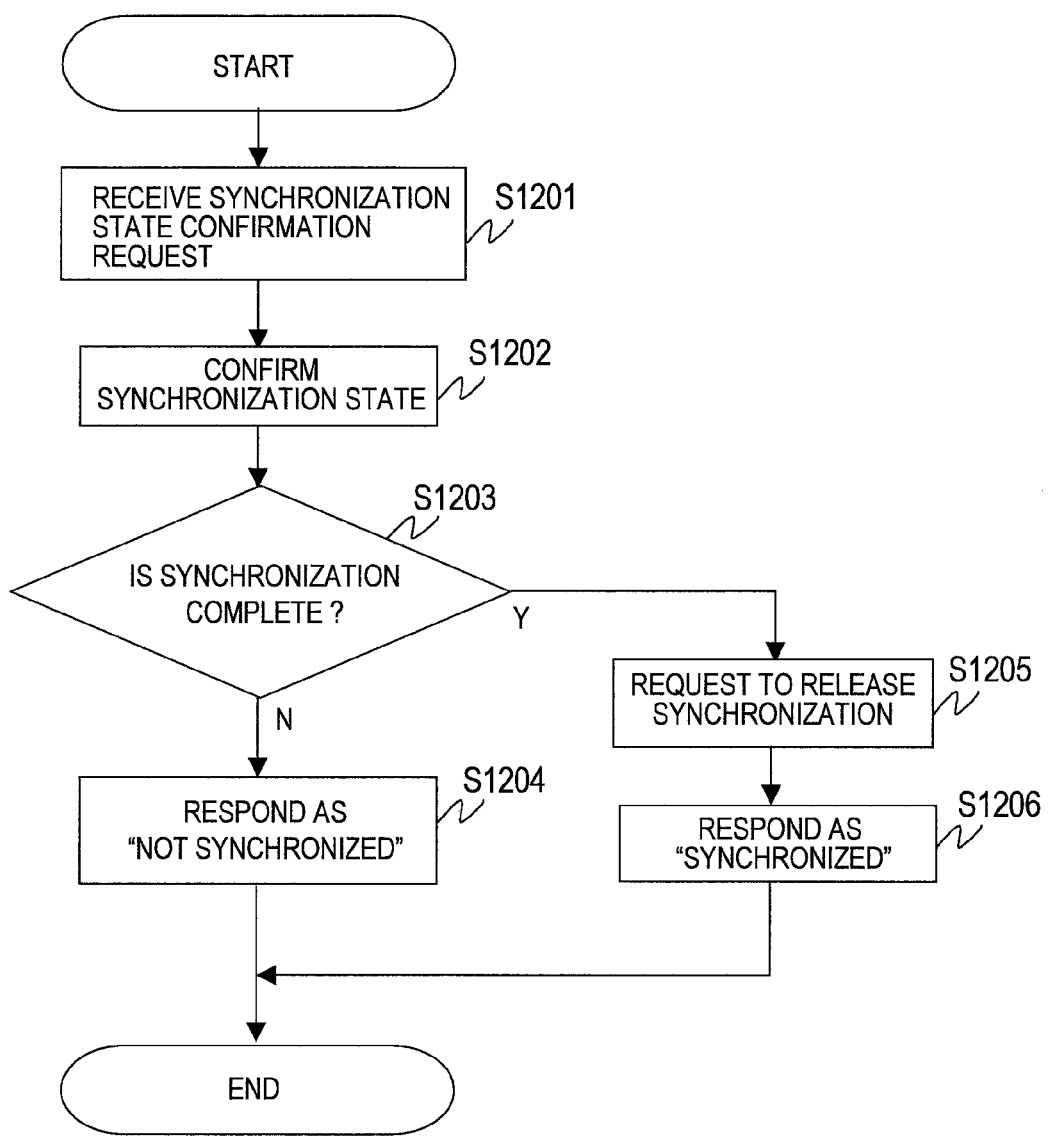
FIG. 27 is a flowchart of the process by the synchronization state response process subprogram executed by the request-source user VNAS according to the second embodiment of this invention.

FIG. 27 is a flowchart of the process by the synchronization state response process subprogram 2325 executed by the request-source user VNAS 25A according to the second embodiment of this invention.

First, the request-source user VNAS 25A provided for the request-source NAS server 2A receives a synchronization state confirmation request from the request-destination user VNAS 25B provided for the request-destination NAS server 2B (S1201). Then, the request-source user VNAS 25A confirms the synchronization state between the main volume and the sub volume provided for the request-source disk subsystem 1A (S1202).

Then, the request-source user VNAS 25A determines whether the synchronization between the main volume and the sub volume has been completed (S1203).

If the synchronization has not been completed, the request-source user VNAS 25A returns a response: "Not Synchronized" to the request-destination user VNAS 25B, which has transmitted the synchronization state confirmation request (S1204). Then, the request-source user VNAS 25A finishes the synchronization state response process subprogram 2325.

On the other hand, if the synchronization has been completed, the request-source user VNAS 25A requests the request-source disk subsystem 1A to release the synchronization between the main volume and the sub volume (S1205). Then, the request-source disk subsystem 1A releases the synchronization between the main volume and the sub volume by splitting the main volume and the sub volume from each other. On this occasion, the request-source disk subsystem 1A updates the mirroring setting management table 135.

Then, the request-source user VNAS 25A requests the request-source disk subsystem 1A to delete the path definition which is the access route to the sub volume. Then, the request-source disk subsystem 1A deletes the definition of the path, which is the access route to the sub volume, from the path definition management table 133.

Then, the request-source user VNAS 25A returns a response: "Synchronized" to the request-destination user VNAS 25B, which has transmitted the synchronization state confirmation request (S1206). Then, the request-source user VNAS 25A finishes the synchronization state response process subprogram 2325.

Figure 28:
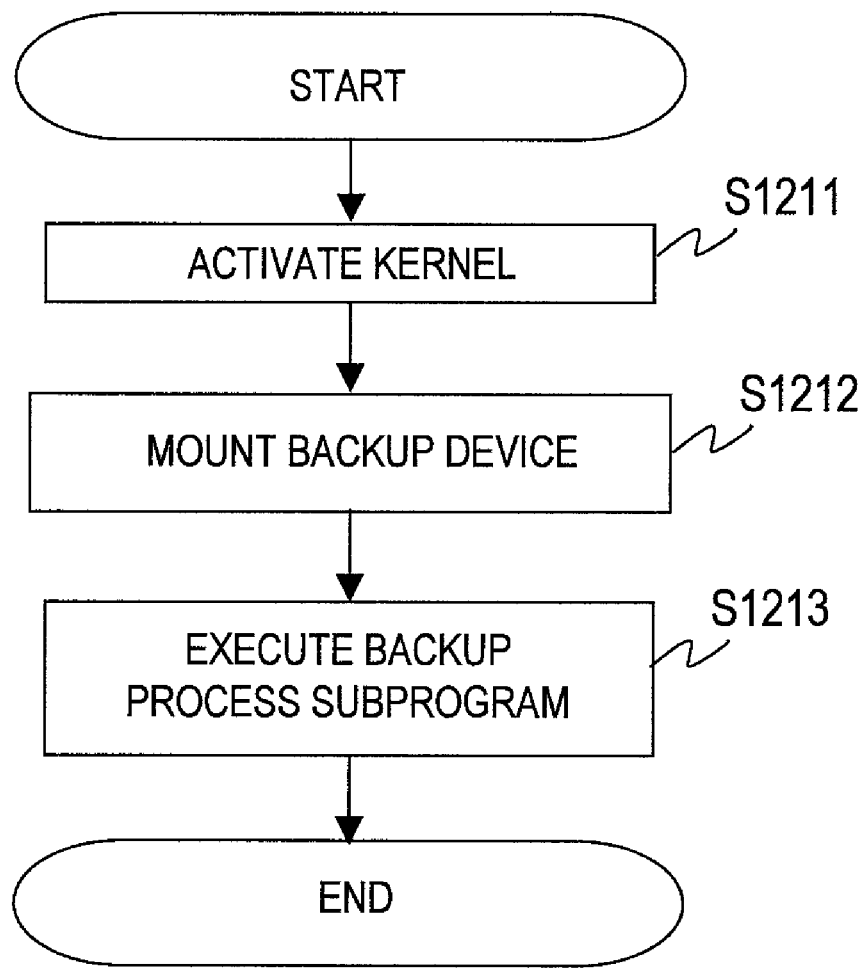
FIG. 28 is a flowchart of the process by the boot process subprogram executed by the request-destination user VNAS according to the second embodiment of this invention.

FIG. 28 is a flowchart of the process by the boot process subprogram 2371 executed by the request-destination user VNAS 25B according to the second embodiment of this invention.

The request-destination user VNAS 25B provided for the request-destination NAS server 2B, upon being activated by the request-destination root VNAS 26B provided for the request-destination NAS server 2B, executes the boot process subprogram 2371.

First, the request-destination user VNAS 25B activates the kernel (S1211). Then, the request-destination user VNAS 25B mounts the backup device 3 (S1212). Then, the request-destination user VNAS 25B executes the backup process subprogram 2323 (S1213). Then, the request-destination user VNAS 25B finishes the boot process subprogram 2371.

Figure 29:
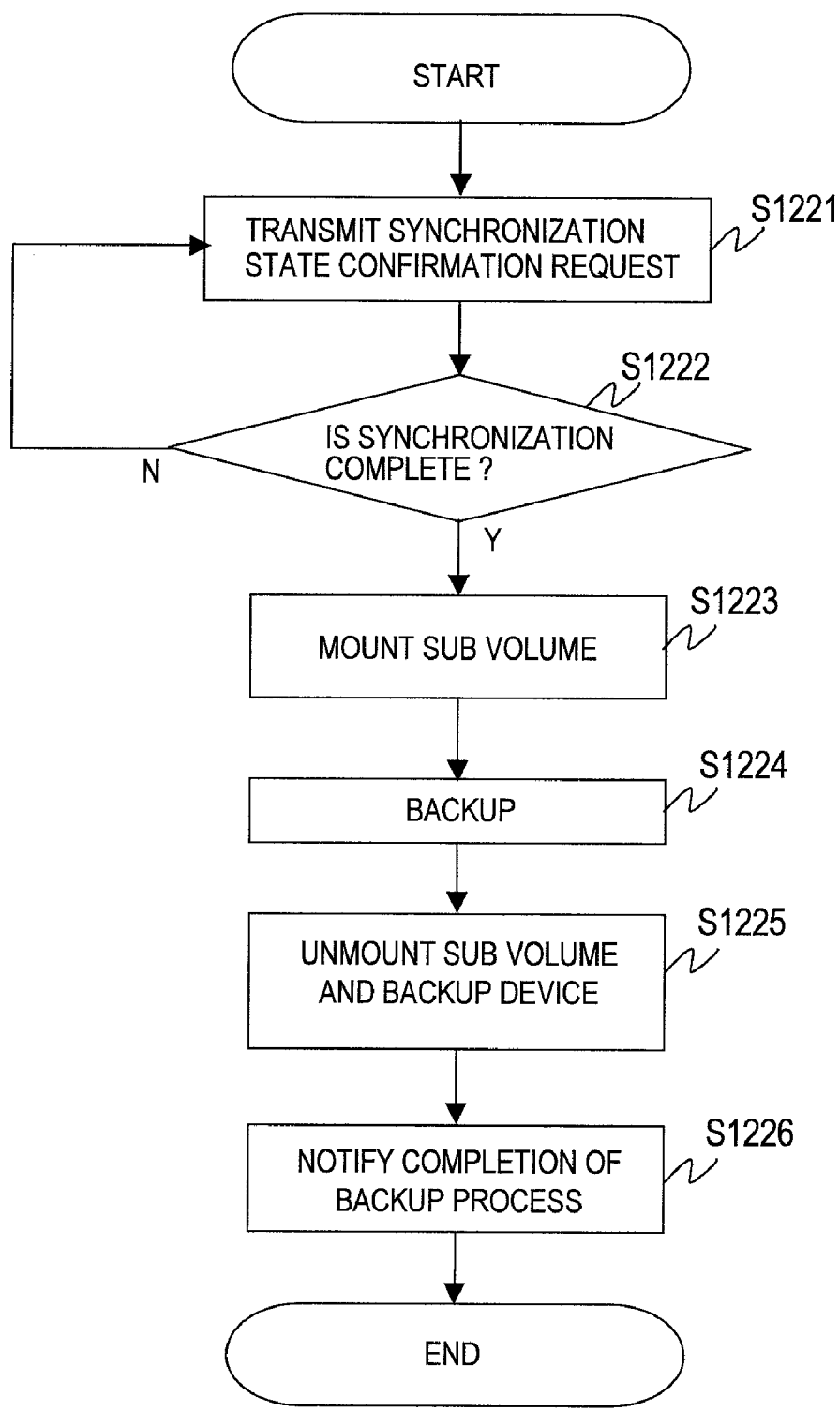
FIG. 29 is a flowchart of the process by the backup process subprogram executed by the request-destination user VNAS according to the second embodiment of this invention.

FIG. 29 is a flowchart of the process by the backup process subprogram 2323 executed by the request-destination user VNAS 25B according to the second embodiment of this invention.

First, the request-destination user VNAS 25B provided for the request-destination NAS server 2B transmits a synchronization state confirmation request to the request-source user VNAS 25A provided for the request-source NAS server 2A (S1221). Then, the request-destination user VNAS 25B receives a response from the request-source user VNAS 25A. Then, the request-destination user VNAS 25B determines whether the synchronization between the main volume and the sub volume has been completed based on the received response (S1222).

The request-destination user VNAS 25B, upon receiving a response: "Not Synchronized", returns to the step S1221. Then, the request-destination user VNAS 25B repeats the steps S1221 and S1222 until the completion of the synchronization.

The request-destination user VNAS 25B, upon receiving a response: "Synchronized", determines that the synchronization has been completed. Then, the request-destination user VNAS 25B refers to the received information on the sub volume to mount the sub volume provided for the request-source disk subsystem 1A (S1223).

Then, the request-destination user VNAS 25B reads out data stored in the mounted sub volume. Then, the request-destination user VNAS 25B stores the read data in the mounted backup device 3. Consequently, the request-destination user VNAS 25B backs up the data stored in the sub volume to the backup device 3 (S1224).

The request-destination user VNAS 25B, after having completed the backup, unmounts the mounted sub volume and the backup device 3 (S1225). Then, the request-destination user VNAS 25B notifies the request-destination root VNAS 26B of the completion of the backup process (S1226).

Then, the request-destination user VNAS 25B finishes the backup process subprogram 2323.

While the present invention has been described in detail and pictorially in the accompanying drawings, the present invention is not limited to such detail but covers various obvious modifications and equivalent arrangements, which fall within the purview of the appended claims.

What is claimed is:

1. A data backup method for a computer system that includes a request-source server device, a request-source storage device coupled to the request-source server device, a request-destination storage device coupled to the request-source storage device via a first communication line, a request-destination server device coupled to the request-destination storage device and coupled to the request-source server device via a second communication line, and a backup storage device coupled to the request-destination server device, the request-source storage device having a disk drive for storing data, and a disk control unit for controlling input and output of data to and from the disk drive, the data backup method comprising:

providing, by the disk control unit, the request-source server device with a storage area of the disk drive as at least one logical volume;

determining, by the request-source server device, upon receiving a request to back up data stored in a first logical volume which is one of the logical volumes, whether a second logical volume which constitutes a copy pair with the first logical volume is present in the request-source storage device;

requesting, by the request-source server device, upon determining that the second logical volume is not present, the request-source storage device to produce the second logical volume; and transmitting, by the request-source server device, a request to execute a process to back up data stored in one of the existing second logical volume and the produced second logical volume to the backup storage device to the request-destination server device.

2. The data backup method according to claim 1, further comprising producing, by the request-destination server device, upon receiving the request to execute the backup process, a virtual server device for executing the requested backup process, wherein the produced virtual server device has an access to the second logical volume of the request-source storage device via the request-destination storage device and the first communication line.

3. The data backup method according to claim 2, further comprising deleting, by the request-destination server device, upon completion of the requested backup process, the produced virtual server device.

4. The data backup method according to claim 1, further comprising releasing, by the request-source storage device, before the request-source server device transmits the request to execute the backup process to the request-destination server device, the copy pair constituted by the first logical volume and the second logical volume.

5. The data backup method according to claim 4, further comprising reconstituting, by the request-source server device, upon completion of the requested backup process in a case where the request-source server device determines that the second logical volume is present, the copy pair with the first logical volume and the second logical volume.

6. The data backup method according to claim 1, further comprising:

transmitting, by the request-source server device, upon receiving a request to restore data stored in a third volume which is one of the logical volumes, a request to execute a restore process to the request-destination server device; and producing, by the request-destination server device, upon receiving the request to execute the restore process, a virtual server device used for executing the requested restore process;

wherein the produced virtual server device has an access to the third logical volume via the request-destination storage device and the first communication line.

7. The data backup method according to claim 6, further comprising deleting, by the request-destination server device, upon completion of the requested restore process, the produced virtual server device.

8. A computer system, comprising:
a request-source server device;
a request-source storage device coupled to the request-source server device;
a request-destination storage device coupled to the request-source storage device via a first communication line;

a request-destination server device coupled to the request-destination storage device and coupled to the request-source server device via a second communication line; and a backup storage device coupled to the request-destination server device, wherein:

the request-source storage device comprises a disk drive for storing data, and a disk control unit for controlling input and output of data to and from the disk drive;

the request-source storage device provides the request-source server device with a storage area of the disk drive as at least one logical volume;

the request-source server device determines, upon receiving a request to back up data stored in a first logical volume which is one of the logical volumes, whether a second logical volume which constitutes a copy pair with the first logical volume is present in the request-source storage device;

the request-source server device requests, upon determining that the second logical volume is not present, the request-source storage device to produce the second logical volume; and the request-source server device transmits a request to execute a process to back up data stored in one of the existing second volume and the produced second logical volume to the backup storage device to the request-destination server device.

9. The computer system according to claim 8, wherein:

the request-destination server device produces, upon receiving the request to execute the backup process, a virtual server device for executing the requested backup process; and the produced virtual server device has an access to the second logical volume of the request-source storage device via the request-destination storage device and the first communication line.

10. The computer system according to claim 8, wherein the request-destination server device deletes, upon completion of the requested backup process, the produced virtual server device.

11. The computer system according to claim 8, wherein the request-source server device releases, before the request-source server device transmits the request to execute the backup process to the request-destination server device, the copy pair constituted by the first logical volume and the second logical volume.

12. The computer system according to claim 11, wherein the request-source server device reconstitutes, upon completion of the requested backup process in a case where the request-source server device determines that the second logical volume is present, the copy pair with the first logical volume and the second logical volume.

13. The computer system according to claim 8, wherein:

the request-source server device transmits, upon receiving a request to restore data stored in a third volume which is one of the logical volumes, a request to execute a restore process to the request-destination server device;

the request-destination server device produces, upon receiving the request to execute the restore process, a virtual server device for executing the requested restore process; and the produced virtual server device has an access to the third logical volume via the request-destination storage device and the first communication line.

14. The computer system according to claim 13, wherein the request-destination server device deletes, upon completion of the requested restore process, the produced virtual server device.

15. A data backup method for a computer system that includes a request-source server device, a request-source storage device coupled to the request-source server device, a request-destination storage device coupled to the request-source storage device via a first communication line, a request-destination server device coupled to the request-destination storage device and coupled to the request-source server device via a second communication line, and a backup storage device coupled to the request-destination server device, the request-source storage device having a disk drive for storing data, and a disk control unit for controlling input and output of data to and from the disk drive, the data backup method comprising:

providing, by the disk control unit, the request-source server device with a storage area of the disk drive as at least one logical volume; and producing, by the request-destination server device, upon receiving a request to execute a backup process, a virtual server device used for executing the requested backup process, wherein the produced virtual server device has an access to the logical volume via the request-destination storage device and the first communication line.

16. The data backup method according to claim 15, further comprising:

determining, by the request-source server device, upon receiving a request to back up data stored in a first logical volume which is one of the logical volumes, whether a second logical volume which constitutes a copy pair with the first logical volume is present in the request-source storage device;

requesting, by the request-source server device, upon determining that the second logical volume is not present, the request-source storage device to produce the second logical volume; and transmitting, by the request-source server device, a request to execute a process to back up data stored in one of the existing second volume and the produced second logical volume to the backup storage device to the request-destination server device.

17. The data backup method according to claim 16, further comprising executing, by the produced virtual server device, upon confirming that the first logical volume and the second logical volume are in a pair state, the backup process.

18. The data backup method according to claim 15, further comprising deleting, by the request-destination server device, upon completion of the requested backup process, the produced virtual server device.

19. The data backup method according to claim 15, further comprising producing, by the request-destination server device, upon receiving a request to execute a restore process, a virtual server device for executing the requested restore process, wherein the produced virtual server device has an access to the logical volume of the request-source storage device via the request-destination storage device and the first communication line.

20. The data backup method according to claim 19, further comprising deleting, by the request-destination server device, upon completion of the requested restore process, the produced virtual server device.

* * * * *